US012632601B2

(12) United States Patent
Berlin et al.

(10) Patent No.: US 12,632,601 B2
(45) Date of Patent: May 19, 2026

(54) TECHNIQUES FOR MANAGING OPERATIONAL ASPECTS OF A WEB BROWSER RELATIVE TO USER PRIVACY CONSIDERATIONS

(71) Applicant: Apple Inc., Cupertino, CA (US)

(72) Inventors: Jessie L. Berlin, San Jose, CA (US); Aram D. Kudurshian, San Francisco, CA (US); Charles D. Deets, Capitola, CA (US); Charles H. Ying, San Mateo, CA (US); Marcel Van Os, Santa Cruz, CA (US); Marco Triverio, San Francisco, CA (US); Samantha Liu, San Diego, CA (US); Steven J. Falkenburg, Los Altos, CA (US); Wenson Hsieh, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 23 days.

(21) Appl. No.: 18/677,587

(22) Filed: May 29, 2024

(65) Prior Publication Data

US 2024/0403489 A1      Dec. 5, 2024

Related U.S. Application Data

(60) Provisional application No. 63/506,053, filed on Jun. 2, 2023.

(51) Int. Cl.
*G06F 21/62*      (2013.01)
*G06F 21/31*      (2013.01)
(52) U.S. Cl.
CPC .......... *G06F 21/6263* (2013.01); *G06F 21/31* (2013.01)

(58) Field of Classification Search
CPC ............................ G06F 21/6263; G06F 21/31
See application file for complete search history.

(56) References Cited

U.S. PATENT DOCUMENTS

| | | | | |
|---|---|---|---|---|
| 8,166,406 B1 * | 4/2012 | Goldfeder | ........... | G06F 21/6263 |
| | | | | 709/224 |
| 12,182,777 B1 * | 12/2024 | Hawes | ............... | G06Q 20/0855 |
| 12,314,430 B1 * | 5/2025 | Hardt | .................. | G06F 21/6245 |
| 12,314,449 B1 * | 5/2025 | Kats | .................... | H04L 63/0428 |

(Continued)

*Primary Examiner* — Stephen T Gundry
(74) *Attorney, Agent, or Firm* — BAKERHOSTETLER; Kyle B. Morse

(57) ABSTRACT

The embodiments set forth techniques for managing operational aspects of a web browser application relative to user privacy considerations. More particularly, the described embodiments provide techniques for mitigating webpage loading issues associated with a web browser application that implements privacy protection measures. The mitigation techniques include detecting a webpage loading issue, displaying a prompt that enables the webpage to be reloaded with reduced privacy protection measures, and reloading the webpage with the reduced privacy protection measures. The described embodiments also provide techniques for identifying conditions under which a web browser should be locked in association with providing private web browsing functionalities, locking the web browser under such conditions, and permitting the web browser to be unlocked when an acceptable authentication is performed. The described embodiments further provide techniques for providing user interfaces that enable the foregoing techniques to be implemented.

20 Claims, 12 Drawing Sheets

(56) References Cited

U.S. PATENT DOCUMENTS

| | | | |
|---|---|---|---|
| 2006/0253579 A1* | 11/2006 | Dixon | G06Q 30/02 |
| | | | 709/225 |
| 2012/0324094 A1* | 12/2012 | Wyatt | H04W 4/60 |
| | | | 709/224 |
| 2012/0324568 A1* | 12/2012 | Wyatt | H04W 12/128 |
| | | | 726/13 |
| 2015/0074224 A1* | 3/2015 | Kleinhout | H04L 67/535 |
| | | | 709/217 |
| 2016/0117409 A1* | 4/2016 | Cherian | H04L 67/02 |
| | | | 715/234 |
| 2017/0249394 A1* | 8/2017 | Loeb | H04L 63/0407 |
| 2017/0257393 A1* | 9/2017 | De Barros | H04L 63/1416 |
| 2025/0023952 A1* | 1/2025 | Kauffman | H04L 67/146 |
| 2025/0045460 A1* | 2/2025 | Brannon | H04L 67/565 |
| 2025/0139292 A1* | 5/2025 | Chen | G06F 21/62 |
| 2025/0141869 A1* | 5/2025 | Avetisov | H04L 63/0876 |
| 2025/0148559 A1* | 5/2025 | Kramer | G06K 19/06037 |
| 2025/0150438 A1* | 5/2025 | Ellington | G06F 21/44 |
| 2025/0165895 A1* | 5/2025 | Barhoumeh | H04L 65/4015 |
| 2025/0175348 A1* | 5/2025 | Jacobson | H04L 9/3247 |
| 2025/0258920 A1* | 8/2025 | Ben-Noon | H04W 12/08 |

* cited by examiner

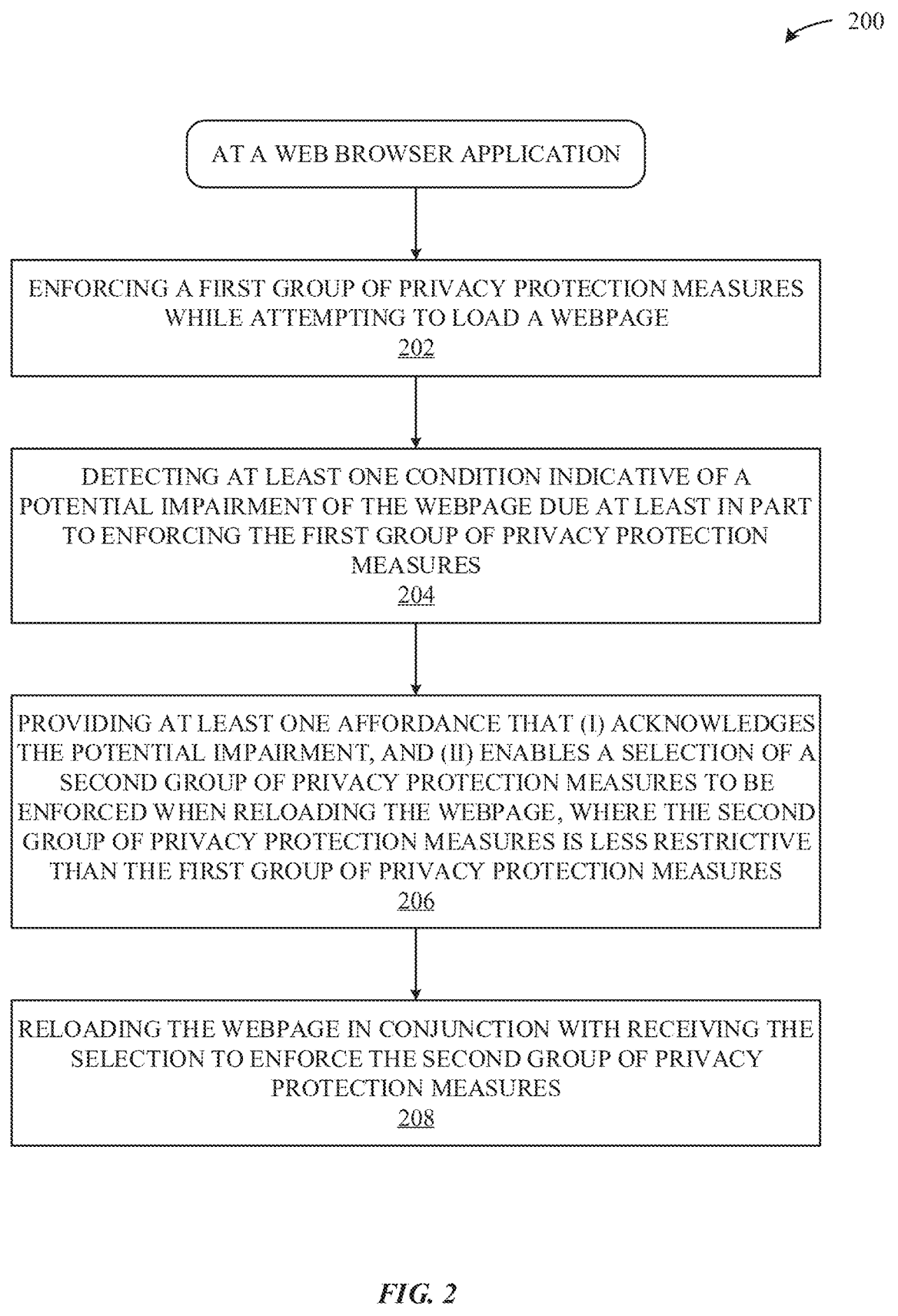

200

```
        ┌─────────────────────────────────────┐
        │   AT A WEB BROWSER APPLICATION      │
        └─────────────────────────────────────┘
                        │
                        ▼
```

ENFORCING A FIRST GROUP OF PRIVACY PROTECTION MEASURES
WHILE ATTEMPTING TO LOAD A WEBPAGE
202

DETECTING AT LEAST ONE CONDITION INDICATIVE OF A
POTENTIAL IMPAIRMENT OF THE WEBPAGE DUE AT LEAST IN PART
TO ENFORCING THE FIRST GROUP OF PRIVACY PROTECTION
MEASURES
204

PROVIDING AT LEAST ONE AFFORDANCE THAT (I) ACKNOWLEDGES
THE POTENTIAL IMPAIRMENT, AND (II) ENABLES A SELECTION OF A
SECOND GROUP OF PRIVACY PROTECTION MEASURES TO BE
ENFORCED WHEN RELOADING THE WEBPAGE, WHERE THE SECOND
GROUP OF PRIVACY PROTECTION MEASURES IS LESS RESTRICTIVE
THAN THE FIRST GROUP OF PRIVACY PROTECTION MEASURES
206

RELOADING THE WEBPAGE IN CONJUNCTION WITH RECEIVING THE
SELECTION TO ENFORCE THE SECOND GROUP OF PRIVACY
PROTECTION MEASURES
208

*FIG. 2*

Entry 302
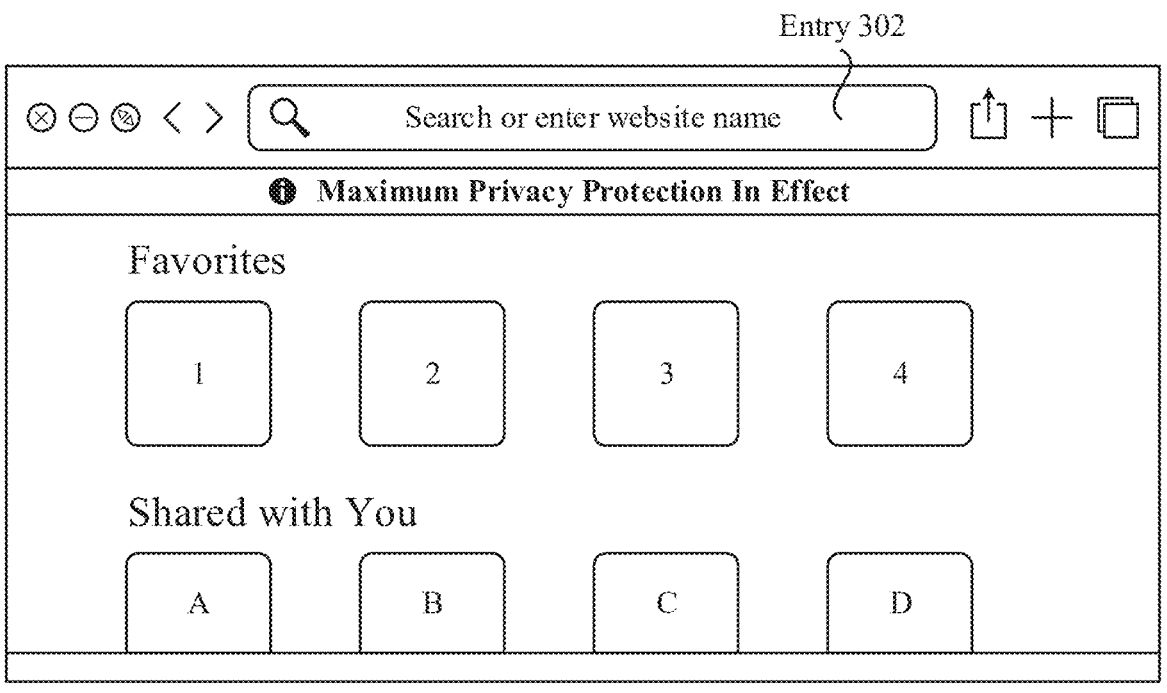
*FIG. 3A*
Reload 306
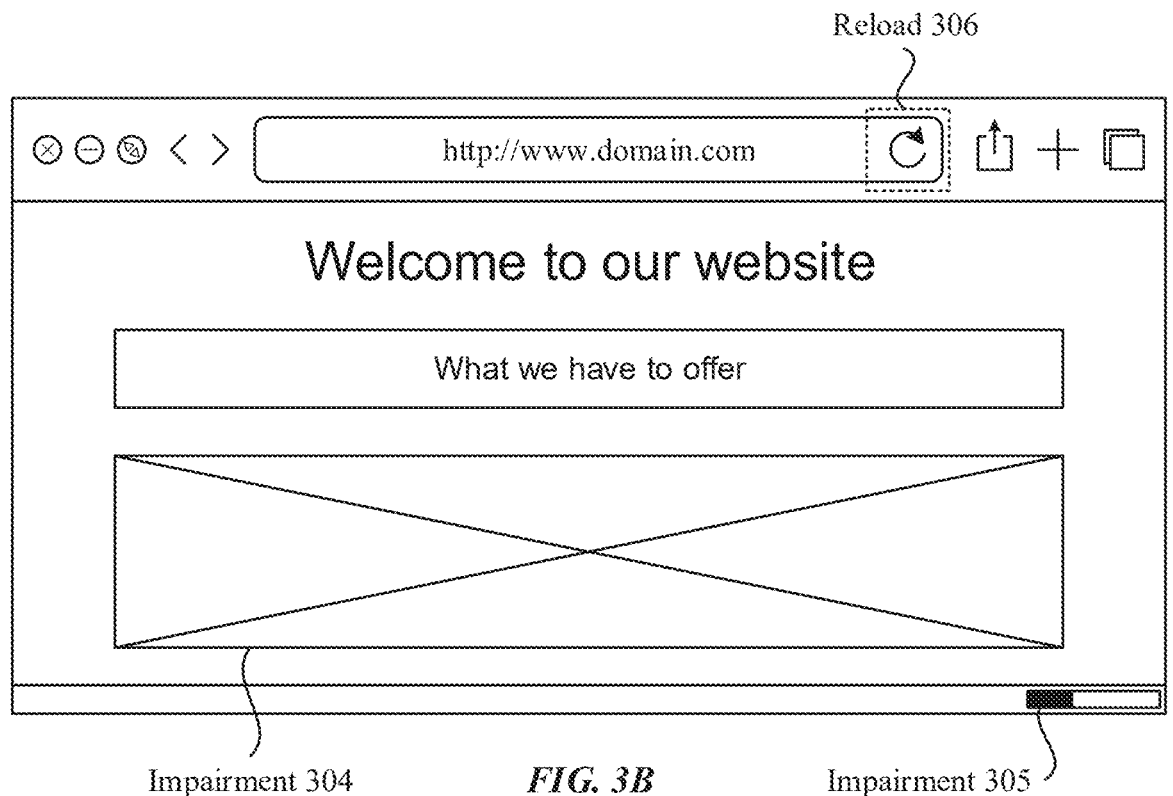
Impairment 304     *FIG. 3B*     Impairment 305

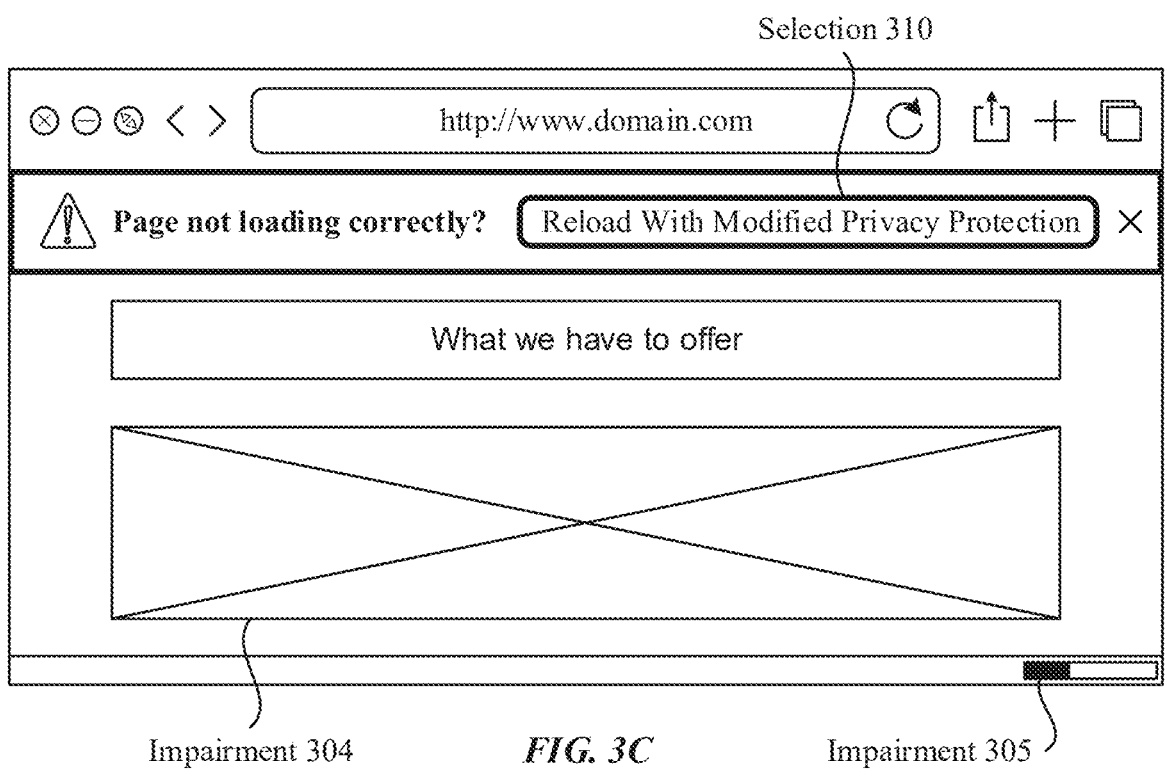
Selection 310
http://www.domain.com
⚠ Page not loading correctly?    Reload With Modified Privacy Protection   ✕
What we have to offer
Impairment 304      *FIG. 3C*      Impairment 305
http://www.domain.com
Welcome to our website
What we have to offer
Impairment Mitigation 312      *FIG. 3D*

Termination 314

Selection 316

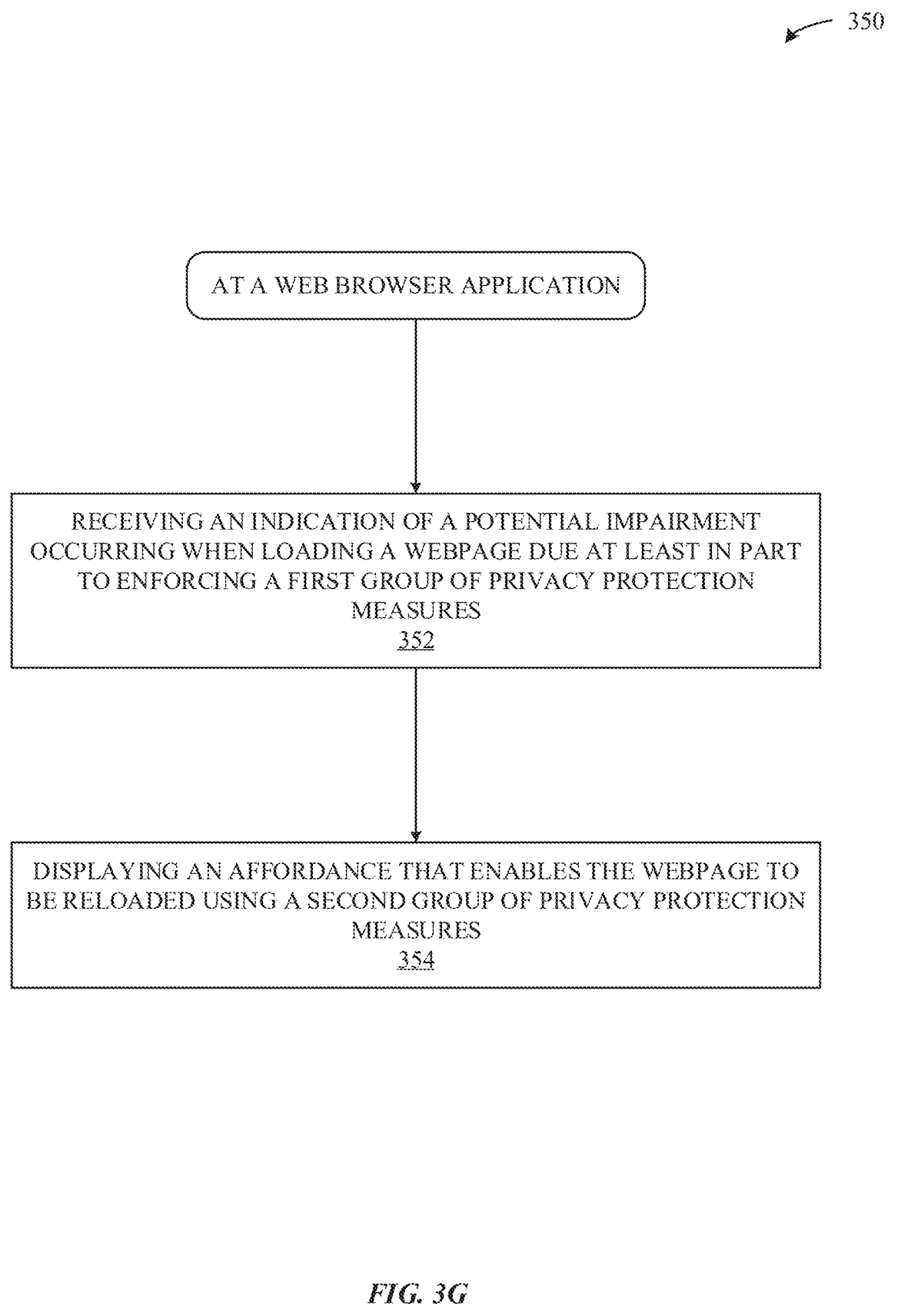

350

AT A WEB BROWSER APPLICATION

RECEIVING AN INDICATION OF A POTENTIAL IMPAIRMENT OCCURRING WHEN LOADING A WEBPAGE DUE AT LEAST IN PART TO ENFORCING A FIRST GROUP OF PRIVACY PROTECTION MEASURES
352

DISPLAYING AN AFFORDANCE THAT ENABLES THE WEBPAGE TO BE RELOADED USING A SECOND GROUP OF PRIVACY PROTECTION MEASURES
354

*FIG. 3G*

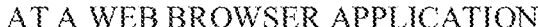
400

AT A WEB BROWSER APPLICATION

LOADING AT LEAST ONE PRIVATE WEB BROWSER WINDOW WITHIN
THE WEB BROWSER
APPLICATION
402

DETECTING AT LEAST ONE CONDITION WHERE THE AT LEAST ONE
PRIVATE WEB BROWSER WINDOW SHOULD TRANSITION INTO A
LOCKED STATE UNDER WHICH CONTENT WITHIN THE AT LEAST
ONE PRIVATE WEB BROWSER WINDOW IS INACCESSIBLE
404

TRANSITIONING THE AT LEAST ONE PRIVATE WEB BROWSER
WINDOW INTO THE LOCKED STATE, WHERE, UNDER THE LOCKED
STATE, THE AT LEAST ONE PRIVATE WEB BROWSER WINDOW
DISPLAYS AN AFFORDANCE FOR TRANSITIONING INTO AN
UNLOCKED STATE
406

*FIG. 4*

Selection 502

Entry 504

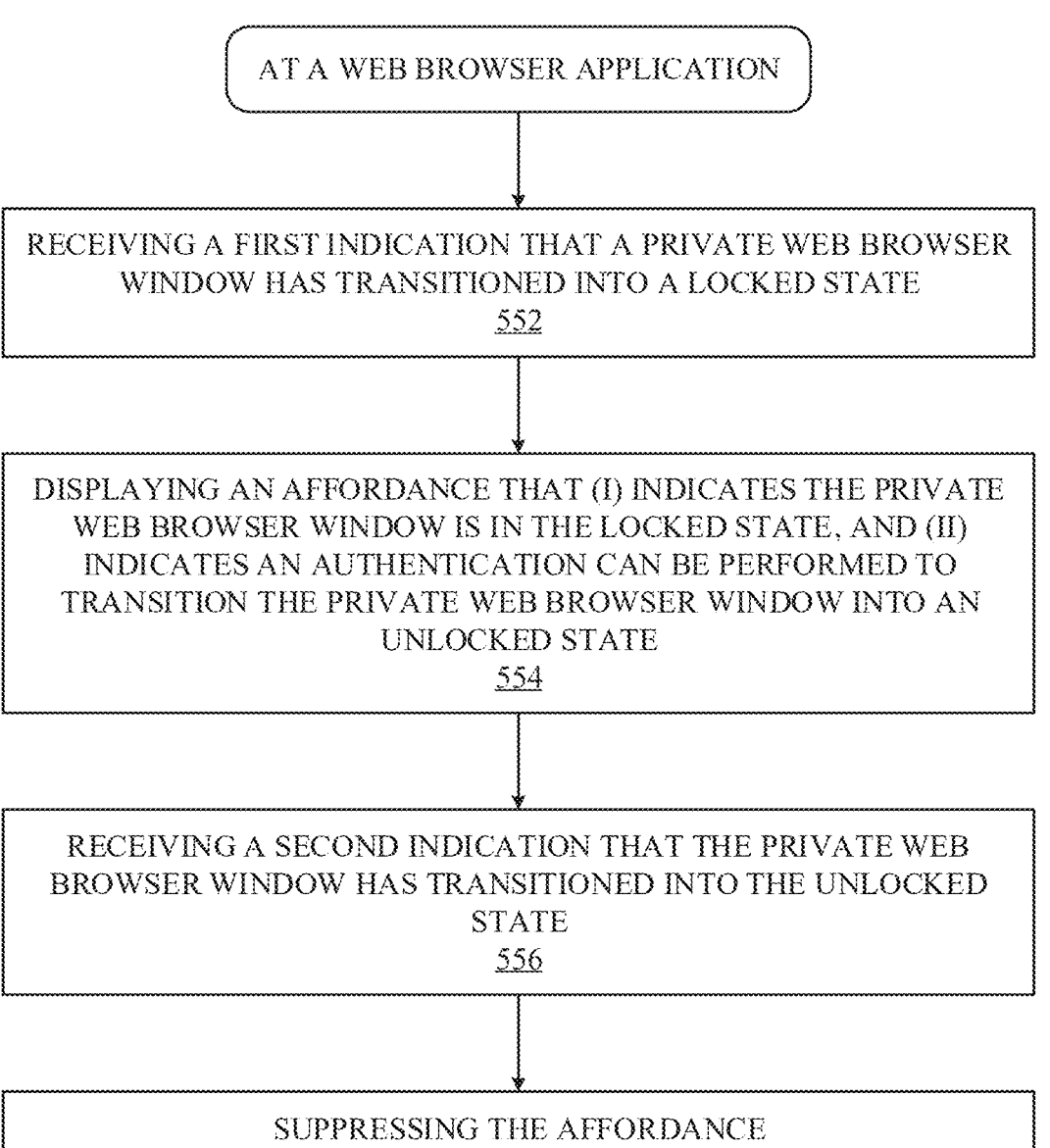

550

AT A WEB BROWSER APPLICATION

RECEIVING A FIRST INDICATION THAT A PRIVATE WEB BROWSER
WINDOW HAS TRANSITIONED INTO A LOCKED STATE
552

DISPLAYING AN AFFORDANCE THAT (I) INDICATES THE PRIVATE
WEB BROWSER WINDOW IS IN THE LOCKED STATE, AND (II)
INDICATES AN AUTHENTICATION CAN BE PERFORMED TO
TRANSITION THE PRIVATE WEB BROWSER WINDOW INTO AN
UNLOCKED STATE
554

RECEIVING A SECOND INDICATION THAT THE PRIVATE WEB
BROWSER WINDOW HAS TRANSITIONED INTO THE UNLOCKED
STATE
556

SUPPRESSING THE AFFORDANCE
558

*FIG. 5G*

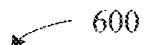
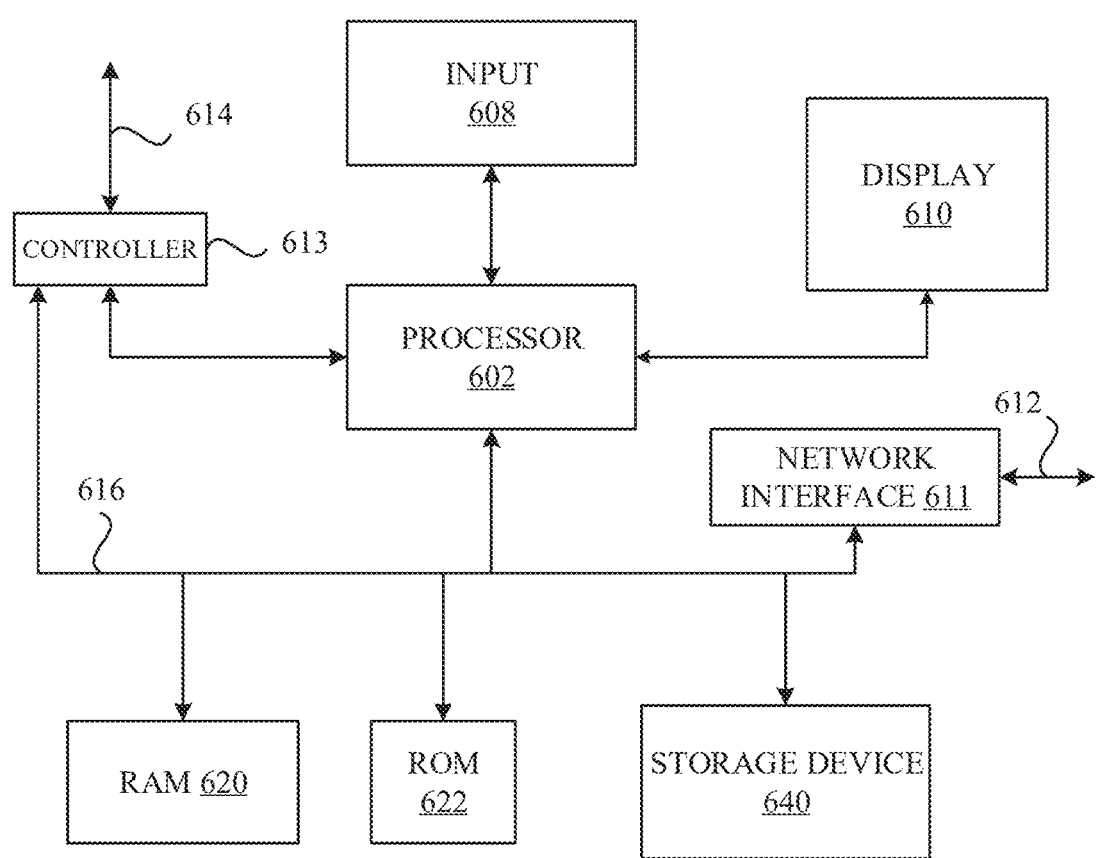
*FIG. 6*

TECHNIQUES FOR MANAGING OPERATIONAL ASPECTS OF A WEB BROWSER RELATIVE TO USER PRIVACY CONSIDERATIONS

CROSS-REFERENCE TO RELATED APPLICATIONS

The present application claims the benefit of U.S. Provisional Application No. 63/506,053, entitled "TECHNIQUES FOR MANAGING OPERATIONAL ASPECTS OF A WEB BROWSER RELATIVE TO USER PRIVACY CONSIDERATIONS," filed Jun. 2, 2023, the content of which is incorporated by reference herein in its entirety for all purposes.

FIELD

The described embodiments relate generally to managing operational aspects of a web browser relative to user privacy considerations. More particularly, the described embodiments provide techniques for mitigating webpage loading issues associated with a web browser application that implements privacy protection measures. The described embodiments also provide techniques for identifying conditions under which a web browser should be locked in association with providing private web browsing functionalities.

BACKGROUND

In the era of digital technology, web browsers have become an essential tool for accessing online resources. However, with the increased use of the Internet, there has been a growing concern about privacy breaches. In particular, web browser utilization generates a considerable amount of personal data that can be easily tracked and monitored by websites, internet service providers, malicious actors, and so on, which is undesirable for a multitude of reasons.

Some web browsers have been modified to provide features aimed at preserving the privacy of their users. For example, many web browsers have built-in privacy features like "Do Not Track" settings that inhibit websites from tracking users' activity. Some web browsers also include ad-blockers that prevent websites from displaying intrusive ads. Additionally, many web browsers offer the option to browse in a private session, where browsing history, cookies, and/or temporary files are disabled/discarded at the conclusion of the private session.

Unfortunately, the aforementioned "Do Not Track" measures can, in many cases, result in webpage loading issues, inaccessible/disrupted services, and so on. These situations create confusion for users in that they are uncertain about the root cause of the problem, the options to mitigate the problem, and so on. Moreover, the aforementioned private web browsing sessions can still lead to inadvertent exposures of sensitive content to unprivileged viewers, which obviates the intended benefits and expectations that users have in relation to such private web browsing sessions.

SUMMARY

The described embodiments relate generally to managing operational aspects of a web browser relative to user privacy considerations. More particularly, the described embodiments provide techniques for mitigating webpage loading issues associated with a web browser application that implements privacy protection measures. The mitigation techniques include detecting a webpage loading issue, displaying a prompt that enables the webpage to be reloaded with reduced privacy protection measures, and reloading the webpage with the reduced privacy protection measures. The described embodiments also provide techniques for identifying conditions under which a web browser should be locked in association with providing private web browsing functionalities, locking the web browser under such conditions, and permitting the web browser to be unlocked when an acceptable authentication is performed. The described embodiments further provide techniques for providing user interfaces that enable the foregoing techniques to be implemented.

One embodiment sets forth a method for addressing webpage loading issues associated with a web browser application executing on a computing device. According to some embodiments, the method can be implemented by the web browser application, and includes the steps of (1) enforcing a first group of privacy protection measures while attempting to load a webpage, (2) detecting at least one condition indicative of a potential impairment of the webpage due at least in part to enforcing the first group of privacy protection measures, (3) providing at least one affordance that (i) acknowledges the potential impairment, and (ii) enables a selection of a second group of privacy protection measures to be enforced when reloading the webpage, where the second group of privacy protection measures is distinct from the first group of privacy protection measures, and (4) reloading the webpage in conjunction with receiving the selection to enforce the second group of privacy protection measures.

Another embodiment sets forth a method for providing user interfaces for addressing webpage loading issues associated with a web browser application executing on a computing device. According to some embodiments, the method can be implemented by the web browser application, and includes the step of, in response to receiving a request to display a second affordance that includes a GUI menu of webpage navigation options: displaying, within the second affordance, a GUI menu item that, when selected, causes the webpage to be reloaded using the second group of privacy protection measures.

Another embodiment sets forth a method for providing private web browsing functionalities associated with a web browser application executing on a computing device. According to some embodiments, the method can be implemented by the web browser application, and includes the steps of (1) loading at least one private web browser window within the web browser application, (2) detecting at least one condition where the at least one private web browser window should transition into a locked state under which content within the at least one private web browser window is inaccessible, and (3) transitioning the at least one private web browser window into the locked state, where, under the locked state, the at least one private web browser window displays an affordance for transitioning into an unlocked state.

Yet another embodiment sets forth a method for providing user interfaces for private web browsing functionalities associated with a web browser application executing on a computing device. According to some embodiments, the method can be implemented by the web browser application, and includes the steps of (1) in response to receiving a first indication that a private web browser window has transitioned into a locked state: displaying an affordance that (i) indicates the private web browser window is in the locked state, and (ii) indicates an authentication can be performed to transition the private web browser window into an unlocked state, and (2) in response to receiving a second indication that the private web browser window has transitioned into the unlocked state: suppressing the affordance.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIG. 2 illustrates a method for addressing webpage loading issues associated with a web browser application executing on a computing device, according to some embodiments.

FIGS. 3A-3F illustrate conceptual diagrams of user interfaces that can be displayed by a web browser application when attempting to address webpage loading issues caused by privacy protection measures, according to some embodiments.

FIG. 3G illustrates a method for providing user interfaces for addressing webpage loading issues associated with a web browser application executing on a computing device, according to some embodiments.

FIG. 4 illustrates a method for providing private web browsing functionalities associated with a web browser application executing on a computing device, according to some embodiments.

FIGS. 5A-5F illustrate conceptual diagrams of user interfaces that can be displayed by a web browser application when providing private web browsing functionalities, according to some embodiments.

FIG. 5G illustrates a method for providing user interfaces for private web browsing functionalities associated with a web browser application executing on a computing device, according to some embodiments.

FIG. 6 illustrates a detailed view of a computing device that can be used to implement the various techniques described herein, according to some embodiments.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description, and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Representative embodiments disclosed herein set forth various techniques for managing operational aspects of a web browser relative to user privacy considerations. More particularly, the described embodiments provide techniques for mitigating webpage loading issues associated with a web browser application that implements privacy protection measures. The mitigation techniques include detecting a webpage loading issue, displaying a prompt that enables the webpage to be reloaded with reduced privacy protection measures, and reloading the webpage with the reduced privacy protection measures. The described embodiments also provide techniques for identifying conditions under which a web browser should be locked in association with providing private web browsing functionalities, locking the web browser under such conditions, and permitting the web browser to be unlocked when an acceptable authentication is performed. The described embodiments further provide techniques for providing user interfaces that enable the foregoing techniques to be implemented.

A more detailed discussion of these techniques is set forth below and described in conjunction with FIGS. 1, 2, 3A-3G, 4, 5A-5G, and 6, which illustrate detailed diagrams of systems and methods that can be used to implement these techniques.

Figure 1:
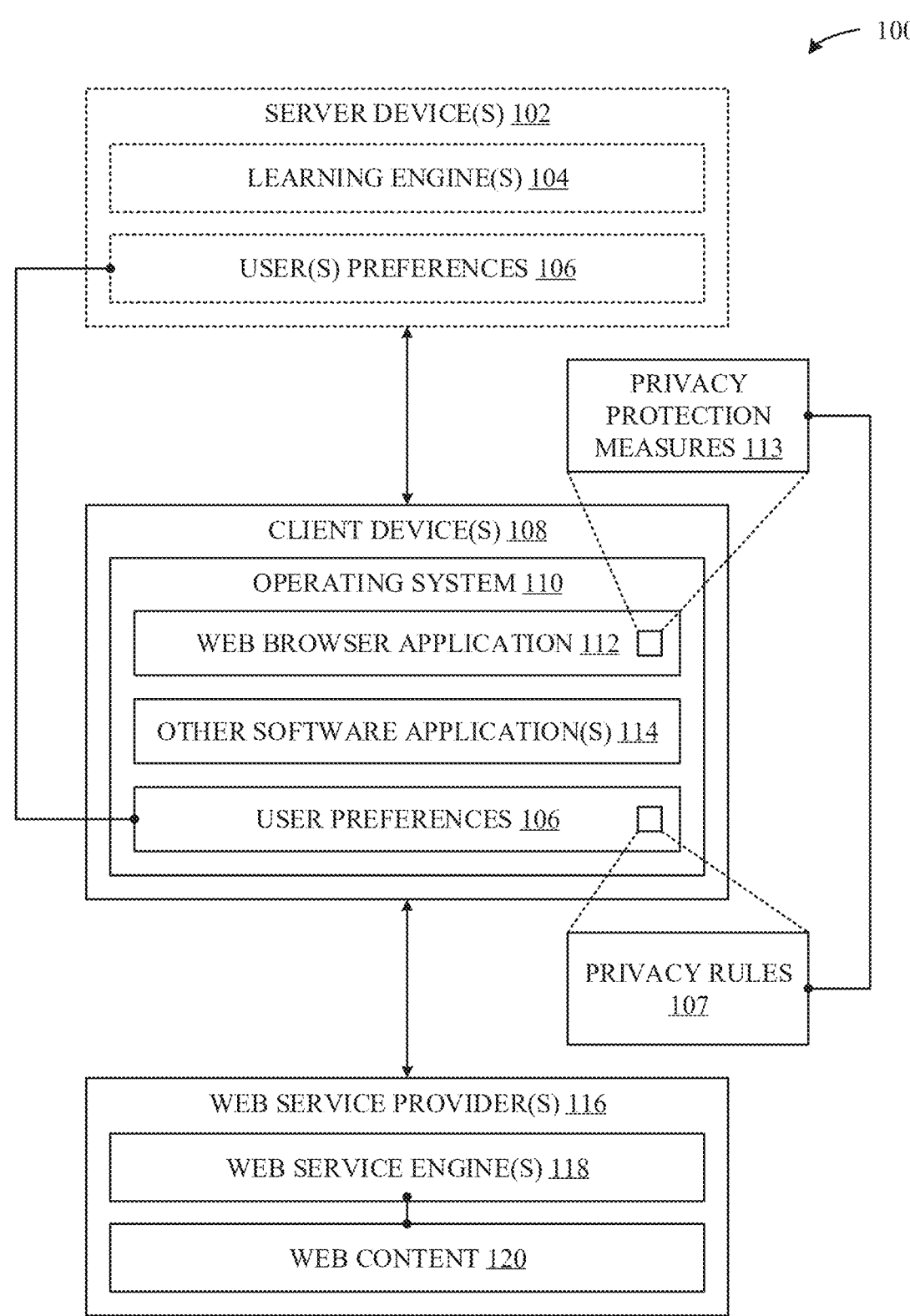
FIG. 1 illustrates a system diagram of a computing device that can be configured to perform the various techniques described herein, according to some embodiments.

FIG. 1 illustrates a block diagram of different components of a system 100 that can be configured to implement the various techniques described herein, according to some embodiments. As shown in FIG. 1, the system 100 can include (optional) one or more server devices 102, one or more client devices 108, and one or more web service providers 116. According to some embodiments, a given server device 102 can (optionally) include one or more learning engines 104, which are described below in greater detail. Additionally, the server device 102 can (optionally) manage user preferences 106 for any number of users. For example, the server devices 102 can provide cloud-based backups of the user preferences 106, distributions of the user preferences 106 to associated/respective client devices 108, and so on. As described herein, the user preferences 106 can guide the manner in which privacy protection measures are enforced relative to network-based services that are being accessed.

According to some embodiments, and as shown in FIG. 1, a given web service provider 116 can include one or more web service engines 118 configured to provide web content 120. For example, a given web service engine 118 can host a website derived from the web content 120. In another example, a given web service engine 118 can host a service that streams content that is stored within the web content 120. It is noted that the foregoing examples are not meant to be limiting, and that the web service providers 116 can provide any form of network-based functionality without departing from the scope of this disclosure.

According to some embodiments, and as shown in FIG. 1, a given client device 108 can manage (i.e., store, load, execute, etc.) an operating system 110 capable of executing a web browser application 112, as well as other software applications 114 (e.g., software applications native to the operating system 110, third-party software applications installed onto the operating system 110 (e.g., via a Software Application Store (i.e., "App Store"), via over the air provisioning, via side loading, etc.), and so on). The operating system 110 can also manage the user preferences 106 previously discussed herein. For example, the user preferences 106 can be established and managed by one or more of the operating system 110, the web browser application 112, the other software application(s) 114, and so on. The user preferences 106 can, optionally, be provided to one or more server devices 102 (e.g., during a cloud backup service).

As a brief aside, it is noted that the embodiments described herein primarily involve web browser applications (i.e., the web browser application 112) in the interest of simplifying this disclosure. However, the same (or similar) techniques can be implemented in any software application without departing from the scope of this disclosure. For example, a web services application-such as a streaming client configured to stream media content from server devices—can implement the same (or similar) features of the web browser application 112 described herein. In other examples, the same (or similar techniques) can be implemented by operating systems, productivity applications, multimedia applications, gaming applications, utility applications, communications applications, education applications, finance applications, health applications, and so on. It is further noted that the terms "website" and "webpage" can represent a single webpage, or multiple webpages, associated with a particular domain, URL, and so on.

As shown in FIG. 1, the web browser application 112 can be configured to implement different privacy protection measures 113 when users utilize the web browser application 112 to access different network-based services (e.g., those offered by the web service providers 116). The privacy protection measures 113 can include, for example, Hypertext Transfer Protocol (HTTP) cookie limitations, webpage executable code limitations (e.g., JavaScript™), web tracker limitations, domain block-list limitations, Internet Protocol (IP) address spoofing limitations, Application Programming Interface (API) limitations, and so on. It is noted that the foregoing examples are not meant to be limiting, and that the privacy protection measures 113 can involve adjusting any aspect of the manner in which the web browser application 112 interacts with network-based services, at any level of granularity, without departing from the scope of this disclosure. According to some embodiments, the privacy protection measures 113 can be derived from, stored within, etc., privacy rules 107 managed in conjunction with the user preferences 106.

As described herein, the implementation of privacy protection measures 113 can cause webpage loading issues to arise under certain circumstances. Consider, for example, a webpage that includes JavaScript™ code for generating at least a portion of the content of the webpage. In this example, when the web browser application 112 attempts to load the webpage—yet implements privacy protection measures 113 that prohibit JavaScript™ code from executing—the portion of the content will not load within the webpage. This can lead to a variety of issues, such as blank areas within the webpage, misalignments between loaded content of the webpage, a stalled loading process of the webpage, and so on. In turn, users often attempt to mitigate such issues by refreshing the webpage, restarting their computer, restarting their router and/or modem, and so on, only to find that the issue typically continues to persist (assuming they stem from the enforcement of problematic privacy protection measures 113).

Accordingly, the web browser application 112 can be configured to identify conditions under which one or more modifications to the privacy protection measures 113 can potentially help avoid or mitigate webpage loading issues. The conditions can include, for example, receiving at least one request to reload the webpage within a threshold period of time (e.g., multiple reload requests received within thirty seconds), detecting at least one rendering issue associated with the webpage, detecting at least one functionality issue associated with the webpage, detecting at least one attempt by the webpage to access at least one Application Programming Interface (API) function that has been adjusted (i.e., in accordance with the presently-enforced privacy protection measures 113), detecting at least one attempt by the webpage to interface with at least one web service provider 116 associated with at least one domain that is blacklisted based on the privacy protection measures 113, detecting at least one attempt by executable code of the webpage to access information included in a Uniform Resource Locator (URL) associated with the webpage, and so on. It is noted that the foregoing examples are not meant to represent an exhaustive list of the conditions under which modifications to the privacy protection measures 113 can be performed. To the contrary, the client devices 108 can be configured to analyze any amount, type, form, etc., of information, at any level of granularity, without departing from the scope of this disclosure.

According to some embodiments, when any of the foregoing (and/or other) conditions are detected, the web browser application 112 can be configured to display an affordance (e.g., a graphical user interface (GUI), an animation, a video clip, an audio clip, etc.) that (i) acknowledges potential issues may have arisen, (ii) enables modified privacy protection measures 113 to be enforced, and (iii) enables the webpage to be reloaded (under the modified privacy protection measures 113). It is noted that the privacy protection measures 113 can be modified at any level of granularity without departing from the scope of this disclosure. In one example, all privacy protection measures 113 can be deactivated to increase a likelihood of mitigating any issues that are caused by the privacy protection measures 113. In another example, one or more of the privacy protection measures 113 can be deactivated—while keeping others active—to potentially mitigate the issues while maintaining any benefits afforded by unproblematic privacy protection measures 113 that remain active. In yet another example, different aspects (e.g., configurations, properties, functionalities, etc.) of one or more of the privacy protection measures 113 can be modified to potentially mitigate the issues. It is noted that any of the foregoing modifications can be manually selected by a user of the web browser application 112. Alternatively, or additionally, any of the foregoing modifications can be recommended to the user and/or automatically applied. For example, the web browser application 112 can be configured to analyze the issues and identify modifications to the privacy protection measures 113 that can potentially mitigate the issues. As described in greater detail below, the web browser application 112 can create, manage, and/or obtain (e.g., from the server device(s) 102) privacy rules 107 that inform the web browser application 112 of the appropriate privacy protection measures 113 to be implemented when interfacing with different websites, web services, and so on.

When the webpage is reloaded, the web browser application 112 can be configured to determine whether enforcing the modified privacy protection measures 113 has mitigated the issues. For example, the web browser application 112 can query the user about whether the modifications to the privacy protection measures 113 mitigated the issues after the webpage was reloaded. If the user indicates that the issues were not mitigated, then the web browser application 112 can recommend additional steps, such as additional modifications to the privacy protection measures 113 that may mitigate the issues. The web browser application 112 can also analyze the webpage at any level of granularity to effectively determine whether the issues have been mitigated. For example, the web browser application 112 can analyze the webpage to identify whether any rendering issues, alignment issues, functionality issues, and so on, remain present. In one example, the web browser application 112 can compare the latest webpage (i.e., the webpage reloaded with modified privacy protection measures 113) against the prior webpage (i.e., the webpage previously loaded with prior privacy protection measures 113) to identify whether new features (i.e., previously unrendered/unfunctional content, previously inaccessible content, etc.) are included in the latest webpage relative to the prior webpage. In another example, the web browser application 112 can identify whether media content (e.g., audio and/or video content, slideshow content, etc.) associated with the webpage, web service, etc., is accessible to the user (e.g., the content is being played-back, interacted with by the user, etc.). It is noted that the foregoing examples are not meant to be limiting, and that the web browser application 112 can perform any number analyses, at any level of granularity, to effectively determine whether the modified privacy protection measures 113 mitigated the issues.

When the web browser application 112 identifies that the modified privacy protection measures 113 have mitigated the issue, the web browser application 112 can register, within the user preferences 106 (e.g., stored in a local storage device, a network storage device, a cloud storage service, etc.), a privacy rule 107 that associates the modified privacy protection measures 113 with identifying information of the webpage. For example, the entry can include domain information, Internet Protocol (IP) address information, etc., of the website, as well as information that enables the modified privacy protection measures 113 to be reconfigured/reapplied accessing the website. In this manner, the web browser application 112 can detect future scenarios where the web browser application 112 is attempting to load the webpage with privacy protection measures 113 that may be problematic (i.e., privacy protection measures 113 that differ from those indicated in the privacy rule 107). In turn, the web browser application 112 can inform the user of potential issues that may arise, suggest applying (or automatically apply) the modified privacy protection measures 113, and so on.

As described herein, the server devices 102 can include one or more learning engines 104. According to some embodiments, the learning engines 104 can be trained using information received from client devices 108 (or other devices) that have opted-in to participate in a feedback program. According to some embodiments, the information can be anonymized (e.g., by the client devices 108 prior to transmission, by the server devices 102 in conjunction with receipt, etc.) such that the information does not include data that otherwise could be linked to specific users. For example, the anonymized information can include (only) (1) information associated with a particular network-based service (e.g., a domain of a webpage), (2) information about the privacy protection measures 113 that were in place when access to the network-based service was attempted, (3) information about the issues that were reported by a user and/or detected by the web browser application 112, and so on. It is noted that the foregoing list is not meant to be exhaustive, and that the anonymized information can include any amount, form, type, etc., of information, at any level of granularity, without departing from the scope of this disclosure.

According to some embodiments, the trained learning engines 104 can be utilized to identify privacy protection measures 113 that effectively enhance privacy without causing the operational issues discussed herein. For example, the learning engines 104 can identify that it is necessary to enforce reduced privacy protection measures 113 in order for a popular webpage to properly function when accessed using the web browser applications 112. In this manner, the server devices 102 can provide configurational guidance to the web browser applications 112 so that the users' overall experience can be enhanced. For example, the web browser application 112 can receive the configurational guidance and store it into the user preferences 106/privacy rules 107 (or other configuration store accessible to the web browser applications 112). In this manner, when a given web browser application 112 receives a request to access the aforementioned popular webpage, the web browser application 112 can, prior to loading the webpage, suggest (e.g., via a GUI prompt) applying the aforementioned modified privacy protection measures 113, automatically apply the aforementioned modified privacy protection measures 113, and so on.

Additionally, and as described in greater detail herein, the web browser application 112 can be configured to provide private web browsing sessions. According to some embodiments, implementing a private web browsing session can involve modifying several aspects of the web browser application 112. Such modifications can include, for example, disabling the browsing history, disabling autofill capabilities, disabling plugins, extensions, etc., disabling the search history, deleting all session data, temporary files, etc., at the conclusion of the private web browsing session, and the like. A given instance (e.g., web browser window) of the web browser application 112 that is operating under a private browsing session is referred to herein as a private web browser application 112.

Importantly, while such modifications can provide enhancements to users' privacy, the users can nonetheless remain at risk of inadvertent privacy exposures. For example, a given user may be interrupted during a private browsing session, place their device into sleep mode, and then subsequently awake their device in an environment where the content of their private browsing session is inadvertently exposed to others. In another example, a given user may simply forget to conclude their private web browsing session—e.g., by maximizing another window over the private web browser application 112, by walking away from their client device 108 while a private web browser application 112 is visible, by accidentally minimizing the private web browser application 112 instead of closing it, and so on. In these examples, it can be beneficial for the content of the private web browser application 112—e.g., the address bar(s), the content, etc., of all browser tabs within the private web browser application 112—to become inaccessible until the user provides appropriate authorization. A private web browser application 112 in which such content inaccessible is referred to herein as a locked web browser application 112.

Accordingly, the private web browser application 112 can identify one or more conditions under which it is appropriate to entered into a locked state. The conditions can include determining that a threshold of period time has elapsed since activity associated with the client device 108/private web browser application 112 was last detected. This can be beneficial, for example, when a user of the client device 108 steps away from, sets down, etc., the client device 108 for the threshold period of time, such that confidential information displayed within the private web browser application 112 may be inadvertently exposed to others who pass by, pick up, etc., the client device 108.

As a brief aside, it is noted that static or dynamic values can be assigned to the thresholds described herein. For example, a static value of five minutes can be assigned to a given threshold. In another example, a dynamic value can be assigned to a given threshold, where the dynamic value varies based on the average level with which the user actively engages the client device 108 (e.g., within moving window of time). The average level can be based on, for example, the frequency at which user-based inputs are received by the client device 108. In this regard, the threshold can be inversely proportional to the average level such that the threshold decreases when the user is actively utilizing the client device 108 (and increases when the user is infrequently utilizing the client device 108). It is noted that the foregoing examples are not meant to be limiting, and that any amount, type, form, etc., of information can be analyzed, at any level of granularity, to establish and/or adjust the thresholds described herein.

The conditions can also include detecting a request to lock the private web browser application 112. For example, the private web browser application 112 can provide one or more affordances, receive one or more hotkeys, receive one or more gestures, etc., for generating the request to lock the private web browser application 112. In another example, the private web browser application 112 can detect the request from another application with which the private web browser application 112 is communicatively coupled, such as the operating system 110, one of the other software applications 114, a remote software application, and so on. In yet another example, the request can be issued (e.g., by the operating system 110) in response to detecting that device (e.g., a smartwatch, a smartphone, etc.) with which the client device 108 is paired has reached (e.g., exceeded) a threshold distance from the client device 108, is no longer communicatively coupled with the client device 108, and so on. It is noted that various approaches can be utilized to make the foregoing detections, such as Wi-Fi-based communications, Bluetooth®-based communications, ultra-wideband-based communications, cellular based communications, and so on.

The conditions can also include determining that the client device 108 is entering into a screensharing mode, a screen recording mode, and/or an external display mode. The screensharing detection can be beneficial, for example, when the user chooses to share their screen during a video conference, such that confidential information displayed within the private web browser application 112 may be inadvertently exposed to others participating in the video conference. The screen recording detection can be beneficial, for example, when the user chooses to record their screen (e.g., during a presentation, during a remote technical support session, etc.), such that confidential information displayed within the private web browser application 112 may be inadvertently recorded, screenshotted, and so on, by unprivileged individuals. The external display mode detection can be beneficial, for example, when the user is connecting their client device 108 to an external monitor, a projector device, etc., such that confidential information displayed within the private web browser application 112 may be inadvertently exposed to anyone who is within audio-visual range of the external display.

The conditions can also include determining that at least one application that substantially covers the private web browser application 112 for a threshold period of time is moved or minimized in a manner that exposes at least a portion of the private web browser application 112. This can be beneficial, for example, when at least one other software application 114 partially (or fully) covers the private web browser application 112 for the threshold period of time, and then is subsequently modified (e.g., resized, minimized, etc.) in a manner that may inadvertently expose confidential information displayed within the private web browser application 112 to others. Similarly, the conditions can also include determining that a threshold period of time has elapsed since private web browser application 112 was in a foreground state. This can be beneficial, for example, when the private web browser application 112 is placed into a background state and is presumably forgotten by the user, such that confidential information displayed within the private web browser application 112 may be inadvertently exposed to others.

The conditions can also include determining that the private web browser application 112 is being loaded in conjunction with a recovery procedure being performed by the web browser application 112. In particular, and according to some embodiments, the web browser application 112 can be configured to automatically reload previous browser windows, tabs, etc., that were instantiated prior to an inadvertent shutdown, crash, etc., of the web browser application 112. According to some embodiments, the web browser application 112 can issue a prompt prior to attempting to reload the previous browser windows, tabs, etc.—however, a prompt alone may not protect against situations where the user has forgotten that one or more private web browser applications 112 were active when the shutdown, crash, etc., occurred. In this regard, the forgetful user may permit the restoration to proceed, which may then lead to the one or more private web browser applications 112 being restored and confidential information being inadvertently exposed to unprivileged viewers. Accordingly, the web browser application 112 can be configured to restore the prior private web browser applications 112 as locked private web browser applications 112. Alternatively, the web browser application 112 can be configured to prompt the user about whether to restore the prior private web browser applications 112 in the locked state, the unlocked state, or not to restore the prior private web browser applications 112 at all. The web browser application 112 can also be configured to automatically disregard (i.e., not restore) the prior private web browser applications 112.

The conditions can also include identifying a transition between the private web browser application 112 to at least one non-private web browser application 112. Consider, for example, a scenario in which the user (1) is interacting with a private web browser application 112, then (2) opens and interacts with a non-private web browser application 112 without terminating the private web browser application 112, and then (3) opens and interacts with another software application 114. In this scenario, there is a risk that the user may, while intending to switch back to the non-private web browser application 112 (e.g., using keyboard shortcuts, icon selection, etc.), inadvertently switch back to the private web browser application 112 instead. Consequently, there is a potential risk of exposing confidential information displayed within the private web browser application 112. In this regard, it can be prudent for the private web browser application 112 to automatically enter into the locked state upon detecting a transition to a non-private web browser application 112.

The conditions can also include receiving a notification that the client device 108 is entering into a lock screen mode, a standby mode, a hibernation mode, or is shutting down. Consider, for example, a scenario in which the user is browsing through a private web browser application 112, places their client device 108 into a lock screen mode (or places it into standby/hibernate modes, shuts it down, etc.) for some time. In this scenario, it is unlikely that the user intends for the private web browser application 112 to be displayed when the client device 108 is reactivated. In this regard, it is prudent to automatically lock the private web browser application 112 when one or more of the foregoing events occur, which can help avoid the inadvertent exposure of sensitive content at the time the client device 108/private web browser application 112 is ultimately reactivated by the user.

The conditions can further include determining that the client device 108 is oriented in a face-down position relative to a surface on which the client device 108 is placed. Consider, for example, a scenario in which a user is browsing through a private web browser application 112, and subsequently encounters one or more individuals in a manner that causes the user to hastily place the client device 108 face-down onto a surface (e.g., a desk, a counter, etc.) (without adequate time to place the client device 108 into a lock screen mode). In this scenario, it is likely that the user would benefit from the private web browser application 112 automatically entering into the locked state in the interest of avoiding the inadvertent exposure of sensitive content when the client device 108 is picked up by the user or any of the individuals.

The conditions can further include determining that the client device 108 is rotated into an upside-down position while the private web browser application 112 is active. This can involve, for example, a topmost side of a mobile device (e.g., a smartphone, a tablet, etc.) pointing toward the ground, which may occur when the user lowers the client device 108 to their side (e.g., upon encountering one or more individuals). The conditions can further include determining that the client device 108 experiences motion that matches (e.g., to a respective threshold degree) at least one motion profile for triggering the private web browser application(s) 112, if any, to transition into the locked state. For example, a given motion profile can correspond to a panic gesture (e.g., shaking the client device 108) that indicates the private web browser application(s) 112 should transition into the locked state. In another example, a given motion profile can correspond to the client device 108 being dropped, which may result in a situation where the client device 108 lands face-up and exposes sensitive content to unprivileged individuals. In this situation, it would be prudent for the private web browser application(s) 112 to automatically lock in response to the drop event in order to avoid any potential exposure of sensitive content to others. It is noted that the foregoing examples are not meant to be limiting, and that any number of sensors (e.g., accelerometers, compasses, etc.) can be utilized to gather information about any form of motion experienced by the client device 108, at any level of granularity, without departing from the scope of this disclosure. It is also noted that the information can be analyzed at any level of granularity, both alone and in combination with other information, without departing from the scope of this disclosure.

The conditions can further include identifying a modification to a screen resolution being output by the client device 108 to at least one display device. Consider, for example, a scenario in which the user is browsing through a private web browser application 112 while the client device 108 outputs at a first screen resolution (e.g., to a local or external display device). In this scenario, the user may reduce the size of the private web browser application 112, place one or more other software applications 114 over the private web browser application 112, etc.—and, at a subsequent time, determine that it is necessary or desirable to adjust the client device 108 to operate at a second screen resolution that is distinct from the first screen resolution. In this regard, the adjustment to the second screen resolution may cause the layouts, sizes, etc., of the private web browser application 112/one or more other software applications 114 to be modified in a manner that exposes at least a portion of the private web browser application 112. Accordingly, it can be beneficial to automatically lock the private web browser application 112 when changes to the screen resolution occur so as to avoid any inadvertent exposure of sensitive information included in the private web browser application 112.

The conditions can further include receiving, from a remote device, a command to transition the private web browser application 112 into the locked state, to terminate the private web browser application 112, and so on. Consider, for example, a scenario in which the user is browsing through a private web browser application 112 on the client device 108. Consider, further, that events transpire where the user becomes unable to access their client device 108—e.g., the client device 108 is left on an airplane, is locked inside another person's house or car, is left at work, is stolen, and so on. When this occurs, it can be desirable to enable the user to access another device through which the user can cause the private web browser application 112 to enter into a locked state, to terminate the private web browser application 112, and so on. Accordingly, the operating system 110/private web browser application 112 can be configured to accept remote commands to lock, terminate, etc., the private web browser application 112. According to some embodiments, the remote commands can originate from devices that are associated with a user account with which the client device 108 is also associated. For example, the user can access any of the devices, perform an authentication associated with the user account (e.g., a password, a one-time code sent to a phone number, email address, etc., associated with the user account, and so on), and subsequently identify and select private web browser application(s) 112 on the client device 108 (and/or other devices, where applicable) that can be remotely locked/terminated.

It is noted that the foregoing examples do not represent an exhaustive list. To the contrary, the web browser application 112 can be configured to transition any number of private web browser applications 112 into locked web browser applications 112, in response to any number of conditions that are identified by analyzing any amount, type, form, etc., of information, at any level of granularity, without departing from the scope of this disclosure. It is additionally noted that one or more of the foregoing thresholds can be disregarded when media content is being played back through the private web browser application 112. For example, if the web browser application 112 determines that a threshold-based condition is satisfied—but that media is being played back through at least one private web browser application 112— then the one or more actions that otherwise would be carried out based on the condition being satisfied can be disregarded.

When one or more of the foregoing conditions are identified, the web browser application 112 can transition at least one private web browser application 112 into a locked web browser application 112. According to some embodiments, transitioning a given private web browser application 112 into a locked web browser application 112 can involve updating the user interface(s) of the locked web browser application 112 to hide all content within the locked web browser application 112. This can involve, for example, hiding the address bar(s) within the locked web browser application 112, hiding the browser tabs (if any) included in the locked web browser application 112, rejecting API calls made to the locked web browser application 112, stopping any media content that was being played back through the private web browser application 112, and so on. It is noted that the foregoing measures are not meant to represent an exhaustive list, and that the locked web browser application 112 can be updated in any capacity, and at any level of granularity, to effectively prevent any information about the private browsing session from being accessed, derived, and so on.

Additionally, the locked web browser application 112 can display an affordance for transitioning into an unlocked state (i.e., for transitioning the locked web browser application 112 back into the private web browser application 112 such that content within the private web browser application 112 becomes accessible). According to some embodiments, the affordance can indicate the (locked) status of the locked web browser application 112 and provide instructions for unlocking the locked web browser application 112. For example, the locked web browser application 112 can be unlocked in response to verifying at least one PIN credential, verifying at least one password credential, verifying at least one biometric credential, verifying at least one credential received from at least one remote device, and so on. Such verifications can be performed by one or more of the operating system 110, the locked web browser application 112, and so on. It is noted that the foregoing examples are not meant to be limiting, and that any form of verification, authentication, etc., can be performed in association with unlocking the locked web browser application 112. When any of the foregoing (and/or other) verifications, authentications, etc., are performed, the locked web browser application 112 can transition into the unlocked state (i.e., a private web browser application 112).

As described above, a locked web browser application 112 can be unlocked in response to verifying a credential that is received from a remote device. According to some embodiments, the credential can be provided by the remote computing device in conjunction with one or more conditions being satisfied. For example, one condition can require that the user of the client device 108 may be seeking to unlock the locked web browser application 112 (e.g., the locked web browser application 112 transitions into a foreground state, receives attempted input(s), etc.). In turn, the client device 108/locked web browser application 112 can transmit an indication to known remote computing devices to display an option to unlock the locked web browser application 112. In another example, a condition can require that the remote computing device and the client device 108 are associated with a common user account. This can involve, for example, the remote computing device and the client device 108 being logged into a common user account, being in possession of at least one common credential (e.g., symmetric and/or asymmetric encryption keys) associated with the common user account, being in possession of at least one token (e.g., respective session keys) associated with the common user account, and so on. In another example, a condition can require that the remote computing device and the client device 108 are communicatively coupled to one another (e.g., via a Wi-Fi connection, a Bluetooth® connection, an ultra-wideband connection, a cellular connection, etc.). This can involve, for example, establishing a direct channel of communication between the remote computing device and the client device 108, establishing an indirect channel of communication between the remote computing device and the client device 108 (e.g., via one or more server devices 102), and so on.

In yet another example, a condition can require that the remote computing device and the client device 108 and are within a threshold distance from one another. The threshold distance between the remote computing device and the client device 108 can be determined using any known approach (es), such performing distance calculations that can be achieved using any of the foregoing communication technologies, using acoustic approaches (e.g., time-of-flight measurements), and so on. In yet another example, a condition can require that the remote computing device is being actively utilized by the user. For example, if the remote computing device is a smartwatch, then active utilization can involve the user wearing the smart watch. In another example, if the remote computing device is a smartphone, tablet, etc., then active utilization can involve the remote computing device receiving some form of user-based input. It is noted that the foregoing conditions are not meant to represent an exhaustive list, and that any number of conditions, at any level of granularity, can be employed/required without departing from the scope of this disclosure.

In any case, when the required conditions are satisfied, the remote computing device can be configured to display an affordance that enables the locked web browser application 112 to transition into an unlocked state. The affordance can include, for example, information about the client device 108 (e.g., a nickname, identifier, etc., of the client device 108), the number of locked web browser applications 112 that can be unlocked, the number of browser tabs included in the locked web browser applications 112, and so on. The affordance can also include, for example, a prompt about whether the user would like to unlock the locked web browser applications 112. The affordance can also provide abilities for the user to unlock the locked web browser applications 112, to disregard the prompt, or to specify a manner in which the locked web browser applications 112 should be unlocked. Modifying how the locked web browser applications 112 are unlocked can involve, for example, providing a list of the locked web browser applications 112, and/or the browser tabs of the locked web browser applications 112, such that the user can provide individual approvals to unlock the locked web browser applications 112/browser tabs (instead of having to approve a complete unlock of all locked web browser applications 112). It is noted that the foregoing examples are not meant to be limiting, and that the remote computing device can enable any form of user input (e.g., device-based inputs, touch-based inputs, voice-based inputs, etc.) to be provided to the remote computing device without departing from the scope of this disclosure. It is further noted that the remote computing device can enable any aspect of the locked web browser applications 112, at any level of granularity, to be modified without departing from the scope of this disclosure. It is further noted that the remote computing device can perform one or more local authentications (e.g., password-based verifications, biometric verifications, etc.) prior to transmitting the credential(s) to the client device 108.

According to some embodiments, when the remote computing device receives an approval to cause the client device 108 to unlock the one or more of the locked web browser applications 112, the remote computing device can transmit, to the client device 108, at least one credential that is known to, or at least verifiable by, the client device 108. For example, the credential can take the form of a password of the user account that is shared between the client device 108, a token that is possessed by each of the remote computing device and the client device 108 (e.g., in response to successfully logging in to the user account at a prior time), data that is encrypted using counterpart symmetric or asymmetric keys of which the remote computing device/client device 108 are in possession, and so on. It is noted that the foregoing examples are not meant to be limiting, and that any approach that enables the client device 108 to effectively authenticate the remote computing device can be implemented without departing from the scope of this disclosure. In any case, the client device 108/locked web browser application 112 can attempt to authenticate the credential—and, upon deeming the credential is valid, the locked web browser application 112 can transition into an unlocked state.

According to some embodiments, transitioning the web browser application 112 into the unlocked state (i.e., into a private web browser application 112) can involve reversing any of the actions taken when previously transitioning the web browser application 112 into the locked state. This can involve, for example, unhiding the address bar(s) within the web private browser application 112, unhiding the browser tabs (if any) included in the private web browser application 112, permitting API calls made to the private web browser application 112, and so on. In some embodiments, playback of the media content that was stopped in conjunction with the prior locking event can remain stopped, which can help avoid inadvertent exposures to sensitive content. In some embodiments, when two or more browser tabs are included in the private web browser application 112, the last-accessed browser tab can be made visible (e.g., its content, its name, etc., can be made visible). Conversely, the content, names, etc., of the other browser tabs can remain blocked, hidden, etc., until they are successively selected, which can also help avoid inadvertent content exposures. It is noted that the foregoing examples are not meant to be limiting, and that the locked web browser application 112 can be unlocked in any fashion, in response to any number of conditions being satisfied, without departing from the scope of this disclosure.

It is noted that various aspects of a given private web browser application 112 can be individually locked/unlocked without departing from the scope of this disclosure. For example, some browser tabs within a private web browser application 112 can transition into a locked state, while others can remain unlocked. Such variations can depend on, for example, user preferences 106 (e.g., the privacy rules 107 included therein), the nature of the content that is loaded within the tabs, whether media content is being played back within the tabs, and so on. For example, when media content is being played back in a first tab within a private web browser application 112, and a user switches one or more other tabs within the private web browser application 112, the media content can continue being played back within the first tab. Moreover, and as described herein, the playback of the media content in any browser tab within the private web browser application 112 can cause the private web browser application 112 to disregard any time-based thresholds (e.g., inactivity thresholds). This approach can help beneficially avoid scenarios where a user is passively engaging with the private web browser application 112 (e.g., viewing content displayed therein) and one or more of the time-based thresholds cause the private web browser application 112 to transition into a locked state. It is noted that the foregoing examples are not intended to represent an exhaustive list, and that the user interface(s), features, browser tabs, etc., can be locked or unlocked, at any level of granularity, without departing from the scope of this disclosure.

It should be understood that the various components of the computing devices illustrated in FIG. 1 are presented at a high level in the interest of simplification. For example, although not illustrated in FIG. 1, it should be appreciated that the various computing devices can include common hardware/software components that enable the above-described software entities to be implemented. For example, each of the computing devices can include one or more processors that, in conjunction with one or more volatile memories (e.g., a dynamic random-access memory (DRAM)) and one or more storage devices (e.g., hard drives, solid-state drives (SSDs), etc.), enable the various software entities described herein to be executed. Moreover, each of the computing devices can include communications components that enable the computing devices to transmit information between one another.

A more detailed explanation of these hardware components is provided below in conjunction with FIG. 6. It should additionally be understood that the computing devices can include additional entities that enable the implementation of the various techniques described herein without departing from the scope of this disclosure. It should additionally be understood that the entities described herein can be combined or split into additional entities without departing from the scope of this disclosure. It should further be understood that the various entities described herein can be implemented using software-based or hardware-based approaches without departing from the scope of this disclosure.

Accordingly, FIG. 1 provides an overview of the manner in which the system 100 can implement the various techniques described herein, according to some embodiments. A more detailed breakdown of the manner in which these techniques can be implemented will now be provided below in conjunction with FIGS. 2, 3A-3G, 4, and 5A-5G.

FIG. 2 illustrates a method 200 for addressing webpage loading issues associated with a web browser application (e.g., a web browser application 112) executing on a computing device (e.g., a client device 108), according to some embodiments. As shown in FIG. 2, the method 200 begins at step 202, where the web browser application enforces a first group of privacy protection measures (e.g., privacy protection measures 113) while attempting to load a webpage (e.g., as described above in conjunction with FIG. 1).

At step 204, the web browser application detects at least one condition indicative of a potential impairment of the webpage due at least in part to enforcing the first group of privacy protection measures (e.g., as also described above in conjunction with FIG. 1). At step 206, the web browser application provides at least one affordance that (i) acknowledges the potential impairment, and (ii) enables a selection of a second group of privacy protection measures (e.g., modified privacy protection measures 113) to be enforced when reloading the webpage, where the second group of privacy protection measures is distinct from (e.g., less restrictive than, different than, etc.) the first group of privacy protection measures (e.g., also as described above in conjunction with FIG. 1).

At step 208, the web browser application reloads the webpage in conjunction with receiving the selection to enforce the second group of privacy protection measures (e.g., as further described above in conjunction with FIG. 1). In turn, the web browser application 112 can perform the various follow-up techniques described above in conjunction with FIG. 1 to determine whether the issues have been mitigated—and, if necessary, take further action.

Figure 3E:
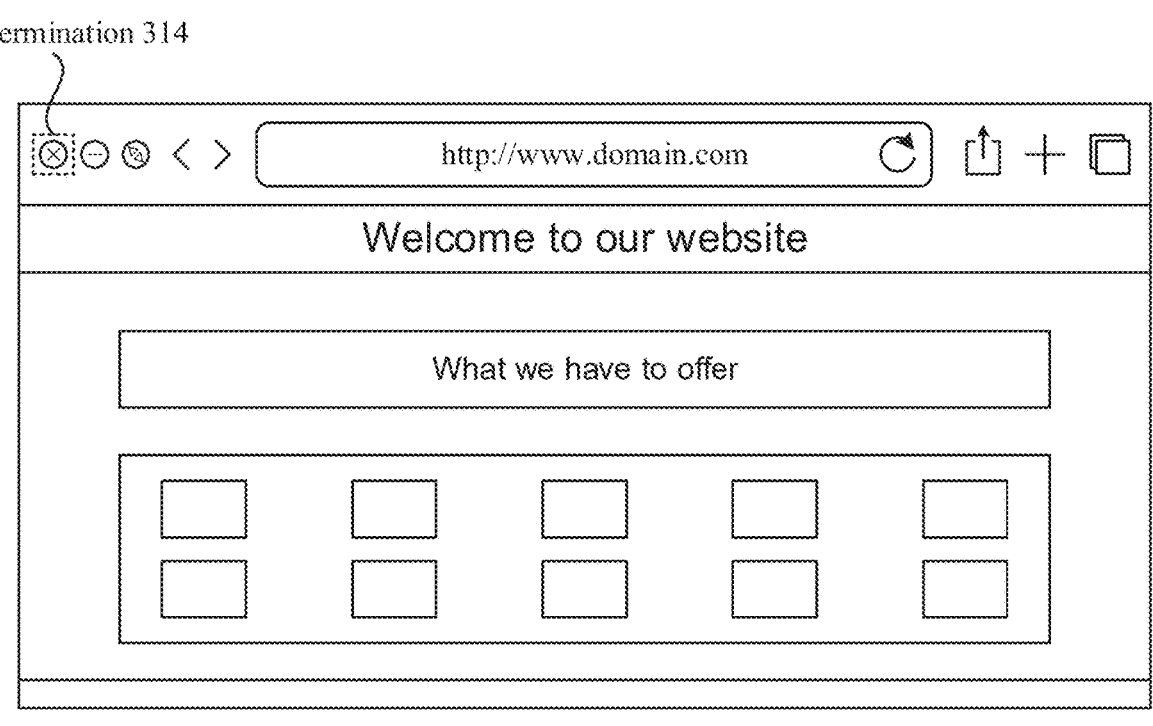

FIGS. 3A-3F illustrate conceptual diagrams of user interfaces that can be displayed by a web browser application 112 when attempting to address webpage loading issues that are potentially caused by privacy protection measures, according to some embodiments. As shown in FIG. 3A, the web browser application 112 is operating in an initial state where navigation has yet to be performed by a user of the web browser application 112. In this regard, the web browser application 112 displays a blank address bar into which search terms, a URL, etc., can be entered, favorite webpages of the user, hyperlinks shared with the user, and so on. As also shown in FIG. 3A, the web browser application 112 can indicate that maximum privacy protection measures 113 are in effect. In the example illustrated in FIG. 3A, the user performs an entry 302 of the URL "http://www.domain-.com" into the address bar of the web browser application 112. The entry 302 causes the web browser application 112 to access the webpage associated with the URL. In turn, the web browser application 112 updates the user interface in accordance with FIG. 3B.

As shown in FIG. 3B, an impairment 304 takes place as the web browser application 112 attempts to load the webpage associated with the URL. In particular, the impairment 304 involves the failure to load at least a portion of the content of the webpage. An impairment 305 also takes place, which involves the progress bar indicating an incomplete loading of the webpage due at least in part to the impairment 304 (and/or other impairments). In this example scenario, one or more of the maximum privacy protection measures 113 are the underlying cause of the impairments 304/305, such that modifications to the privacy protection measures 113 may mitigate the impairments 304/305. In the example illustrated in FIG. 3B, the user notices one or more of the impairments 304/305 and responds by selecting the option to perform a reload operation 306. This operation causes the web browser application 112 to reload the webpage. In turn, the web browser application 112 updates the user interface in accordance with FIG. 3C.

As shown in FIG. 3C, the impairments 304/305 continue to persist despite performing the reload operation 306. In turn—and, in accordance with the techniques discussed herein—the web browser application 112 can identify (or be notified) that an issue is occurring and display a banner that (1) acknowledges the issue, and (2) enables a reload operation to be performed using modified privacy protection measures 113. It is noted that the embodiments are not limited to employing banner-based user interfaces. To the contrary, any affordance can be implemented without departing from the scope of this disclosure. For example, the aforementioned banner can instead be implemented as a popup, a separate browser tab that is loaded, a menu item, and so on. In another example, a manner in which the reload icon (i.e., the clockwise-oriented arrow) is selected can cause different functionalities to be provided. For example, a primary mouse-click (e.g., a left mouse click) of the reload icon can provoke a reload event with the same (i.e., in-place)

privacy protection measures 113. Alternatively, a context-based selection of the reload icon can cause a dropdown menu to be displayed that enables a typical reload event to be processed, or enables a reload event to be processed with the modified privacy protection measures 113. The context-based selection can occur in response to a primary mouse-click combined with a key press of a modifier key, a secondary mouse-click, a key press of a menu key, and so on. It is noted that the foregoing examples of context-based selections are not meant to be limiting, and that any approach for enabling context-based selections can be implemented without departing from the scope of this disclosure. Additionally, the private web browser application 112 can provide selectable menu options. For example, one or more menus of the private web browser application 112 can include an option to reload the webpage using unmodified privacy protection measures 113, using recommended modified privacy protection measures 113, using modified privacy protection measures 113 selected/provided by the user, and so on.

In any case, in FIG. 3C, a selection 310 causes the web browser application 112 to reload the webpage using the modified privacy protection measures 113. In turn, the web browser application 112 updates the user interface in accordance with FIG. 3D. As shown in FIG. 3D, the reload operation (performed using modified privacy protection measures 113) eliminates the impairments 304/305, which is represented as the impairment mitigation 312. In particular, the content of the webpage is now properly displayed due to the modifications made to the privacy protection measures 113. In turn, the user can browse the webpage without the impairments.

Figure 3F:
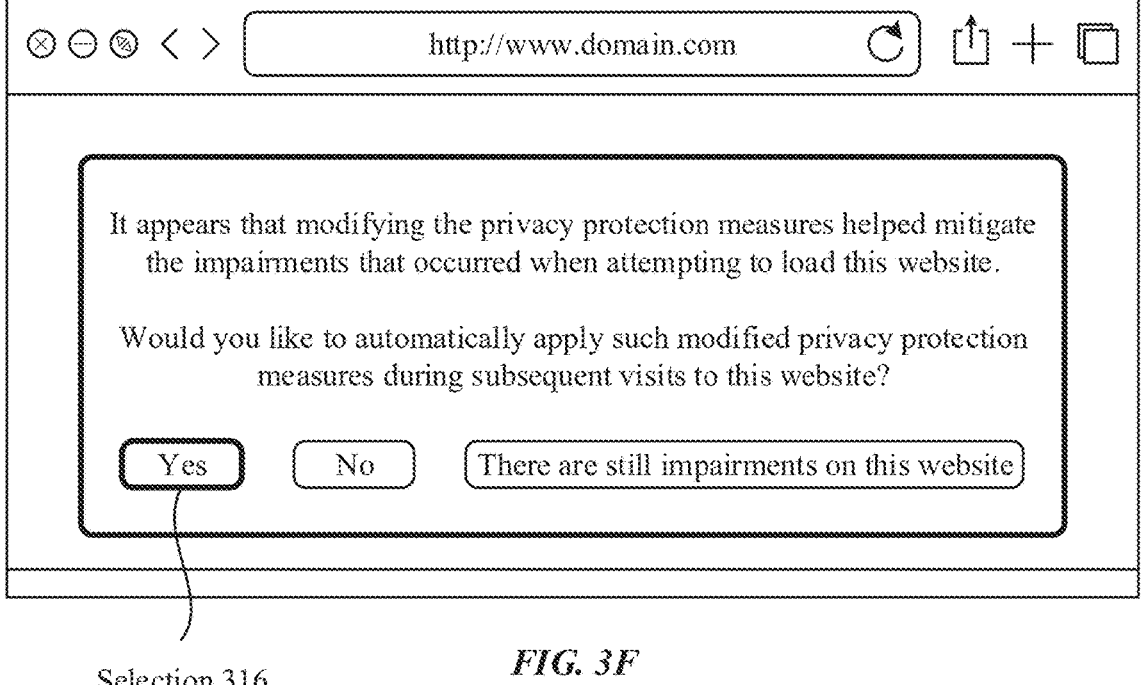

As shown in FIG. 3E, the user can opt to close the web browser application 112, which is represented by the termination 314. In turn, the web browser application 112 updates the user interface in accordance with FIG. 3F. As shown in FIG. 3F, the web browser application 112 informs the user that the modified privacy protection measures 113 appear to have solved the previous issues (i.e., the impairments 304/305). The web browser application 112 also inquires whether the user would prefer the same modified privacy protection measures 113 to be enforced during subsequent visits to the webpage (e.g., by adding one or more privacy rules 107 to the user preferences 106), or whether the same (and/or other) impairments continue to persist on the webpage. As shown in FIG. 3F, the user opts to have the web browser application 112 enforce the same modified privacy protection measures 113 during subsequent visits to the webpage, which is represented by the selection 316. It is noted that the modified privacy protection measures 113 can be associated with any activity, at any level of granularity, performed within the private web browser application 112. For example, the modified privacy protection measures 113 can be associated with a specific webpage, one or more webpages of a specific website, all webpages of a website, all access to a particular domain, and so on.

Alternatively, if the user indicates that the same (and/or other) impairments continue to persist on the webpage, then the web browser application 112 can perform other actions. For example, the web browser application 112 can interface with one or more of the server devices 102 to receive guidance on the appropriate privacy protection measures 113 to be enforced when visiting the website. In another example, the web browser application 112 can interface with the user (e.g., prompt the user with a series of questions) to narrow on how the privacy protection measures 113 should be further-modified to mitigate the issues. In yet another example, the web browser application 112 can analyze the webpage, interface with the webpage's server, etc., to narrow on how the privacy protection measures 113 should be further-modified to mitigate the issues. It is noted that the foregoing examples are not meant to be limiting, and that the web browser application 112 can be configured to perform any follow-up procedures that effectively enable the web browser application 112 to identify modified privacy protection measures 113, if any, that can mitigate the issues.

Accordingly, the user interfaces illustrated in FIGS. 3A-3F provide example implementations of the various techniques discussed herein. Those having ordinary skill in the art will appreciate that the user interfaces can be modified in any fashion to support additional features that are described herein (yet are not explicitly illustrated in the user interfaces illustrated in FIGS. 3A-3F).

FIG. 3G illustrates a method 350 for providing user interfaces for addressing webpage loading issues associated with a web browser application executing on a computing device, according to some embodiments. As shown in FIG. 3G, the method 350 begins at step 352, where the web browser application 112 receives an indication of a potential impairment occurring when loading a webpage due at least in part to enforcing a first group of privacy protection measures (e.g., as described above in conjunction with FIGS. 3A-3F). At step 354, the web browser application 112 displays an affordance that enables the webpage to be reloaded using a second group of privacy protection measures (e.g., as also described above in conjunction with FIGS. 3A-3F).

FIG. 4 illustrates a method 400 for providing private web browsing functionalities associated with a web browser application (e.g., a web browser application 112) executing on a computing device (e.g., a client device 108), according to some embodiments. As shown in FIG. 4, the method 400 begins at step 402, where the web browser application loads at least one private web browser window within the web browser application (e.g., as described above in conjunction with FIG. 1). At step 404, the web browser application detects at least one condition where the at least one private web browser window should transition into a locked state under which content within the at least one private web browser window is inaccessible (e.g., as also described above in conjunction with FIG. 1). At step 406, the web browser application transitions the at least one private web browser window into the locked state, where, under the locked state, the at least one private web browser window displays an affordance for transitioning into an unlocked state (e.g., as further described above in conjunction with FIG. 1).

Figure 5A:
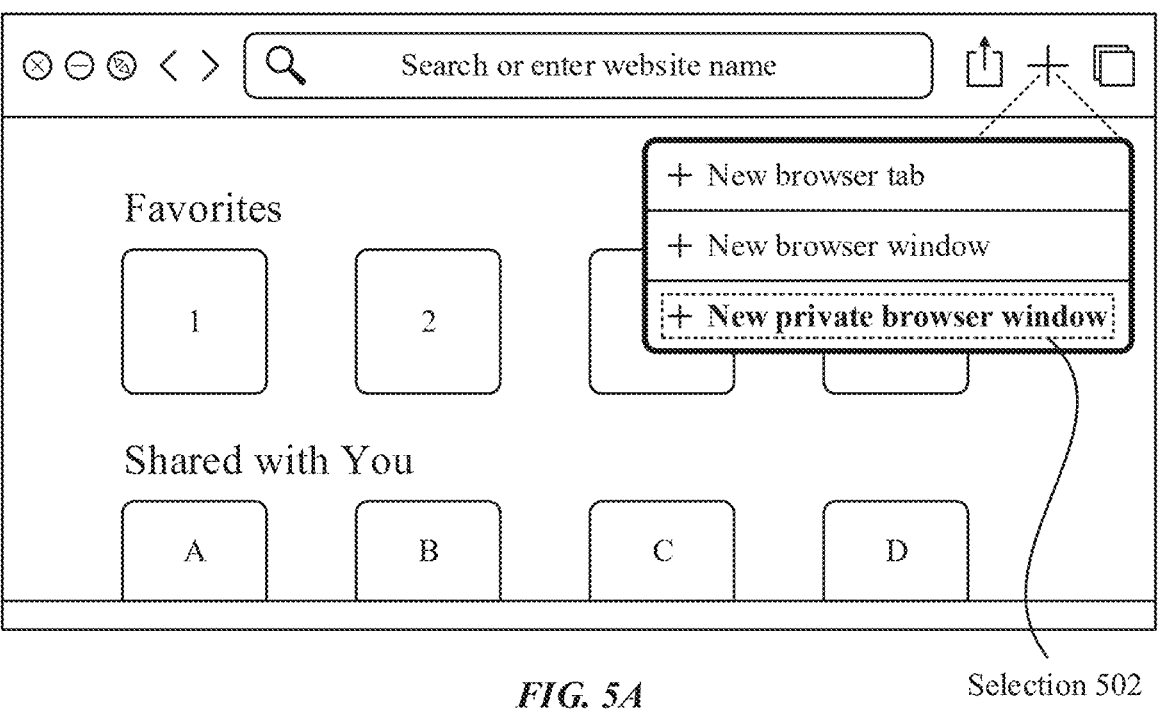
Figure 5B:
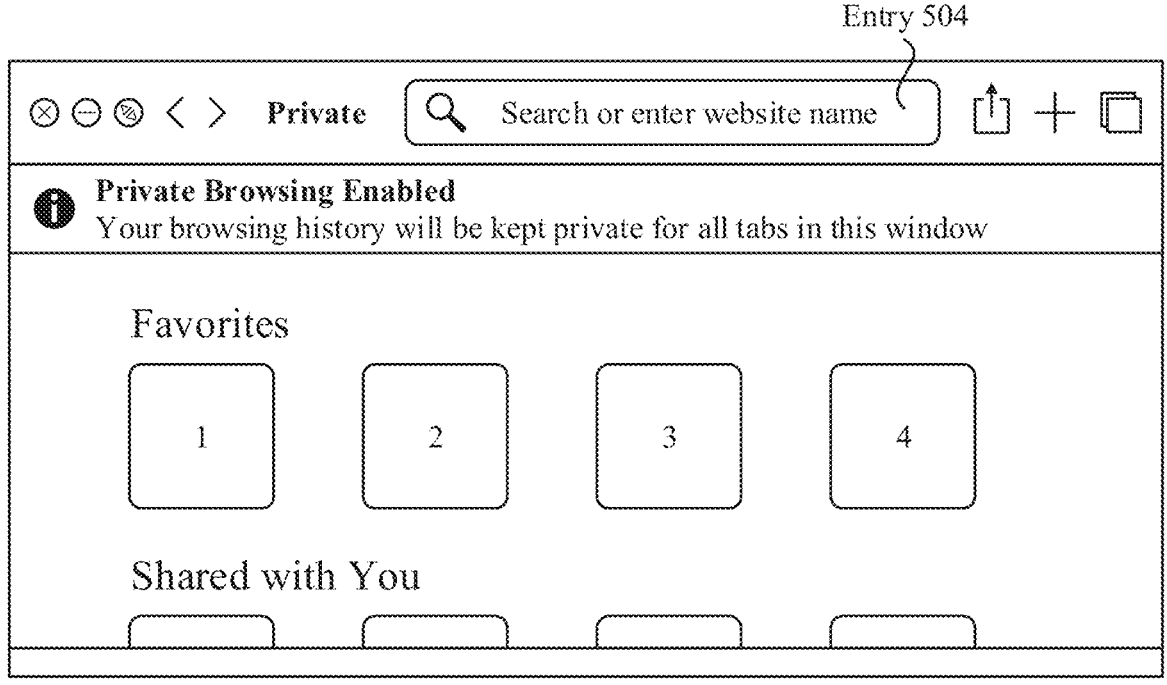
Figure 5C:
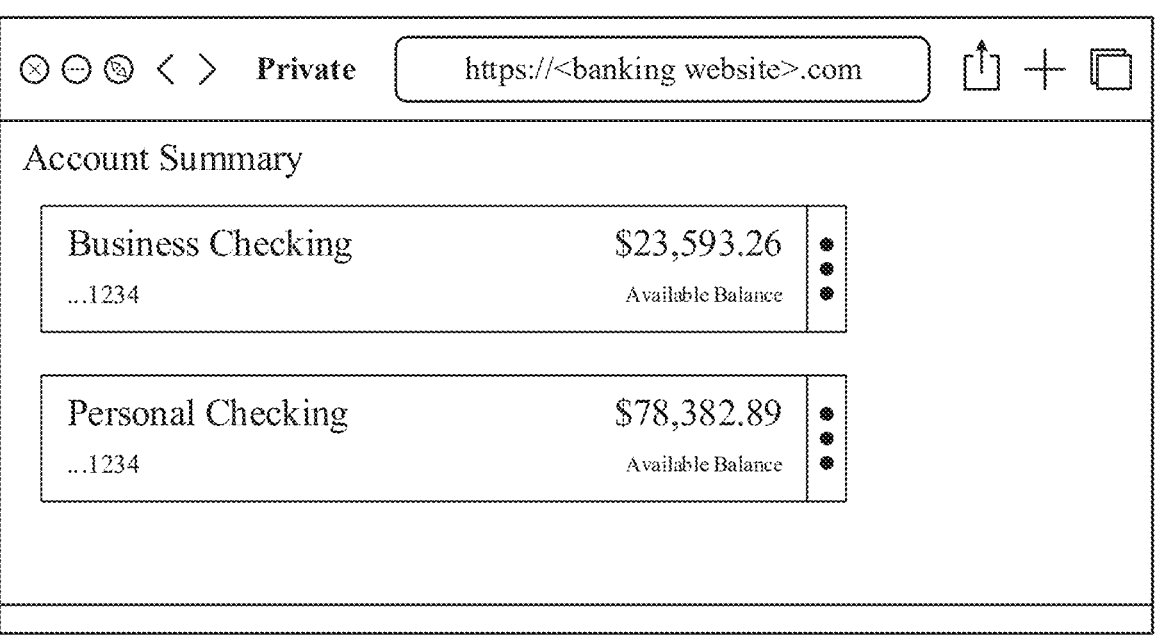

FIGS. 5A-5F illustrate conceptual diagrams of user interfaces that can be displayed by a web browser application 112 when providing private web browsing functionalities, according to some embodiments. As shown in FIG. 5A, the web browser application 112 is operating in an initial state where navigation has yet to be performed by a user of the client device 108 on which the web browser application 112 is executing. In this regard, the web browser application 112 displays a blank address bar into which search terms or a URL can be entered, favorite webpages of the user, hyperlinks shared with the user, and so on. As shown in FIG. 5A, the user interface permits the user to load a new browser tab, a new browser window, or a new private web browser window. The user performs a selection 502 of the option to load a new private web browser window, which causes the web browser application 112 to load a private web browser application 112 (e.g., in accordance with the private web browser application 112 loading techniques described herein). In turn, the web browser application 112 causes the private web browser application 112 to be displayed, which is illustrated in FIG. 5B.

As shown in FIG. 5B, the private web browser application 112 can provide, via a user interface banner, an indication that a private browsing session is enabled, as well as information about what the user can expect from the private browsing session. In the example illustrated in FIG. 5B, the user performs an entry 504 of the URL "https://<banking website>.com" into the address bar of the private web browser application 112. The entry 504 causes the private web browser application 112 to access a webpage associated with the URL. In turn, the private web browser application 112 updates the user interface in accordance with FIG. 5C, which involves loading the webpage associated with the URL. The user can then utilize the private web browser application 112 to navigate the webpage (or other webpages), load (private) browsing tabs within the private web browser application 112 to visit other webpages, and so on.

Figure 5D:
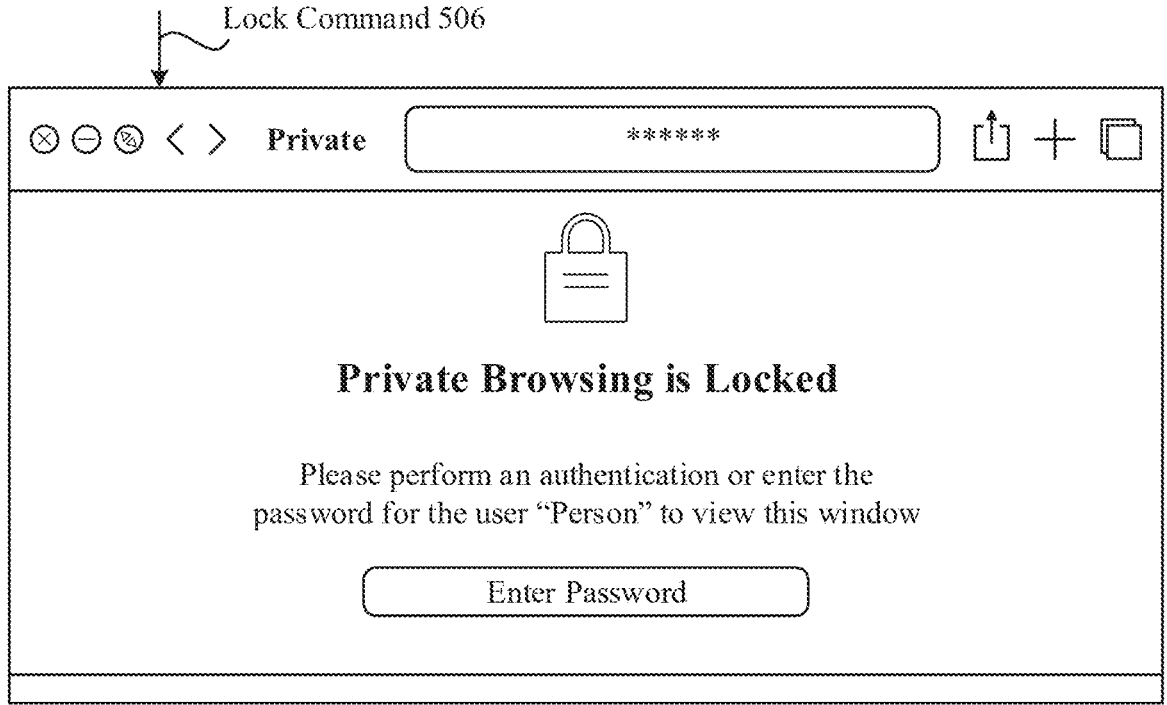

As shown in FIG. 5D, at some point the private web browser application 112 receives a lock command 506 (e.g., in conjunction with any of the locking conditions discussed in herein). In response, the private web browser application 112 updates the user interface in a manner that effectively blocks, hides, etc., any sensitive content that is displayed within the user interface. As shown in FIG. 5D—and, as described herein-such updates can involve blocking the content included in the address bar(s), blocking the content included in the private web browser application 112 (and, if present, browsing tabs associated therewith), blocking API calls to the private web browser application 112, and so on. As also shown in FIG. 5D, the user interface indicates that the private browsing session has been locked and includes instructions on how to unlock the private browsing session. Therefore, at the conclusion of FIG. 5D, the private web browser application 112 has transitioned into a locked web browser application 112.

As described herein, the locked web browser application 112 can be unlocked using a variety of approaches, such as, for example, verifying at least one PIN credential, verifying at least one password credential, verifying at least one biometric credential, verifying at least one credential received from at least one remote device, and so on.

Figure 5E:
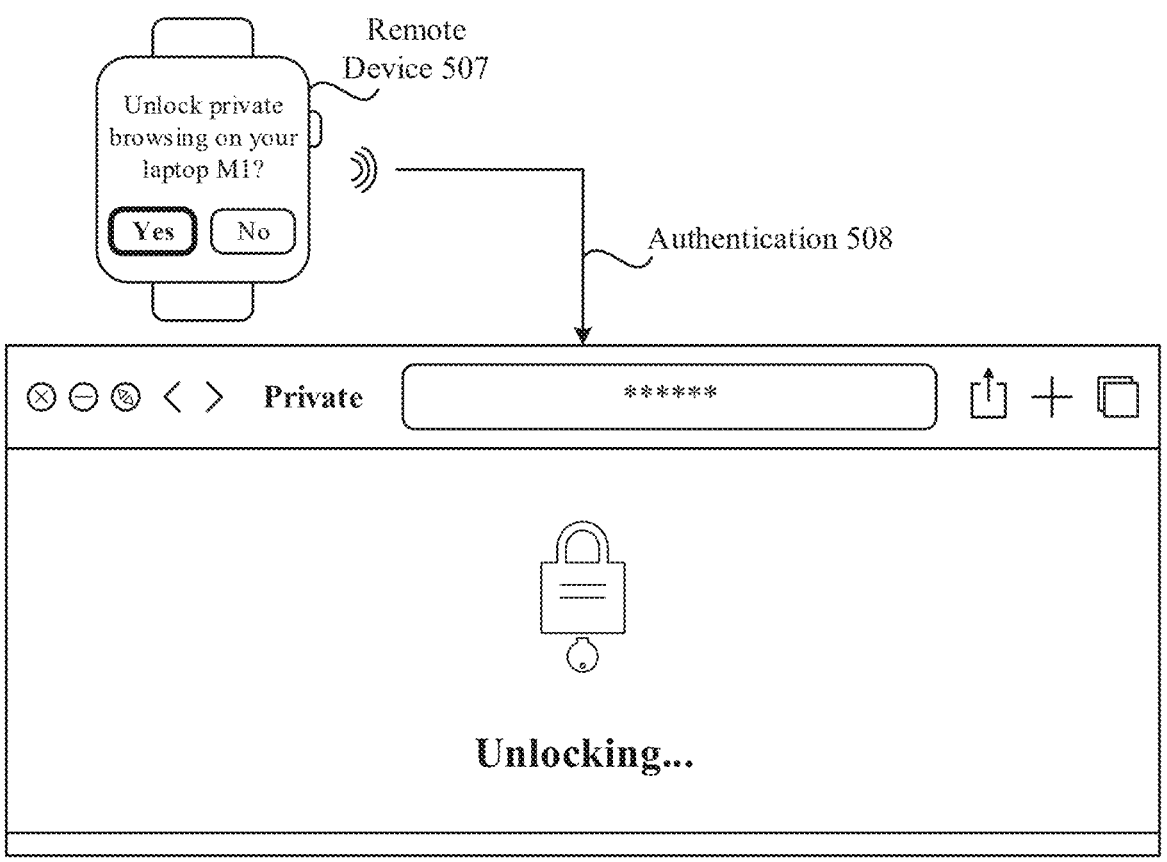

FIG. 5E illustrates a conceptual diagram of an example authentication performed using at least one remote device. In particular, a remote device 507 that is associated with the client device 108 (e.g., by way of a common user account) can determine it is appropriate to display an option to unlock the locked web browser application 112 on the client device 108. According to some embodiments, the remote device 507 can display the option in response to determining that (1) the remote device 507 and the client device 108 are in proximity to one another (e.g., within a threshold distance), (2) the locked web browser application 112 is executing on the client device 108, (3) the locked web browser application 112 has determined that the user of the client device 108 may be seeking to unlock the locked web browser application 112 (e.g., the locked web browser application 112 transitions into a foreground state, receives attempted input(s), etc.), and (4) the remote device 507 is being actively utilized by the user (e.g., the remote device 507 is smartwatch that is being worn by the user). It is noted that the foregoing conditions can be modified to implement alternative approaches without departing from the scope of this disclosure. It is also noted that the remote device 507 and the locked web browser application 112/client device 108 can communicate with one another directly or indirectly (e.g., via one or more server devices 102) to independently or jointly determine whether the foregoing (and/or other) conditions have been satisfied.

When the remote device 507 receives an approval to unlock private browsing on the locked web browser application 112, the remote device 507 can provide an authentication 508 to the locked web browser application 112. In turn—and, as illustrated in FIG. 5F, the web browser application 112 can transition from a locked web browser application 112 to a private web browser application 112 (e.g., in accordance with the techniques described herein).

Accordingly, the user interfaces illustrated in FIGS. 5A-5F provide example implementations of the various techniques discussed herein. Those having ordinary skill in the art will appreciate that the user interfaces can be modified in any fashion to support additional features that are described herein (yet are not explicitly illustrated in the user interfaces illustrated in FIGS. 5A-5F).

FIG. 5G illustrates a method 550 for providing user interfaces for private web browsing functionalities associated with a web browser application executing on a computing device, according to some embodiments. As shown in FIG. 5G, the method 550 begins at step 552, where the web browser application 112 receives a first indication that a private web browser window has transitioned into a locked state (e.g., as described above in conjunction with FIGS. 5A-5F). At step 554, the web browser application 112 displays an affordance that (i) indicates the private web browser window is in the locked state, and (ii) indicates an authentication can be performed to transition the private web browser window into an unlocked state (e.g., as also described above in conjunction with FIGS. 5A-5F). At step 556, the web browser application 112 receives a second indication that the private web browser window has transitioned into the unlocked state (e.g., as also described above in conjunction with FIGS. 5A-5F). At step 558, the web browser application 112 suppresses the affordance (e.g., as also described above in conjunction with FIGS. 5A-5F).

FIG. 6 illustrates a detailed view of a computing device 600 that can be used to implement the various techniques described herein, according to some embodiments. In particular, the detailed view illustrates various components that can be included in the server devices 102, client devices 108, and web service providers 116 described in conjunction with FIG. 1. As shown in FIG. 6, the computing device 600 can include a processor 602 that represents a microprocessor or controller for controlling the overall operation of the computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, and so on. Still further, the computing device 600 can include a display 610 that can be controlled by the processor 602 (e.g., via a graphics component) to display information to the user. A data bus 616 can facilitate data transfer between at least a storage device 640, the processor 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include a wireless transceiver.

As noted above, the computing device 600 also includes the storage device 640, which can comprise a single disk or a collection of disks (e.g., hard drives). In some embodiments, storage device 640 can include flash memory, semiconductor (solid-state) memory or the like. The computing device 600 can also include a Random-Access Memory (RAM) 620 and a Read-Only Memory (ROM) 622. The ROM 622 can store programs, utilities, or processes to be executed in a non-volatile manner. The RAM 620 can provide volatile data storage, and stores instructions related to the operation of applications executing on the computing device 600.

The various aspects, embodiments, implementations, or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The terms "a," "an," "the," and "said" as used herein in connection with any type of processing component configured to perform various functions may refer to one processing component configured to perform each and every function, or a plurality of processing components collectively configured to perform each of the various functions. By way of example, "A processor" configured to perform actions A, B, and C may refer to one or more processors configured to perform actions A, B, and C. In addition, "A processor" configured to perform actions A, B, and C may also refer to a first processor configured to perform actions A and B, and a second processor configured to perform action C. Further, "A processor" configured to perform actions A, B, and C may also refer to a first processor configured to perform action A, a second processor configured to perform action B, and a third processor configured to perform action C.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As described herein, one aspect of the present technology is the gathering and use of data available from various sources to improve user experiences. The present disclosure contemplates that in some instances, this gathered data may include personal information data that uniquely identifies or can be used to contact or locate a specific person. Such personal information data can include demographics data, location-based data, telephone numbers, email addresses, home addresses, data or records relating to a user's health or level of fitness (e.g., vital signs measurements, medication information, exercise information), date of birth, smart home activity, or any other identifying or personal information. The present disclosure recognizes that the use of such personal information data, in the present technology, can be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select to provide only certain types of data that contribute to the techniques described herein. In addition to providing "opt in" and "opt out" options, the present disclosure contemplates providing notifications relating to the access or use of personal information. For instance, a user may be notified that their personal information data may be accessed and then reminded again just before personal information data is accessed.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method, comprising:

enforcing a first group of privacy protection measures while attempting to load a webpage, wherein the webpage includes a first portion and a second portion separate from the first portion, wherein attempting to load the webpage includes loading the first portion of the webpage without loading the second portion of the webpage;

detecting at least one condition indicative of a potential impairment of the webpage due at least in part to enforcing the first group of privacy protection measures, wherein the potential impairment of the webpage includes the second portion of the webpage not being loaded;

providing at least one affordance that (i) acknowledges the potential impairment, and (ii) enables a selection of a second group of privacy protection measures to be enforced when reloading the webpage, wherein the second group of privacy protection measures is distinct from the first group of privacy protection measures; and reloading the webpage in conjunction with receiving the selection to enforce the second group of privacy protection measures.

2. The method of claim 1, wherein detecting the at least one condition comprises at least one of:

receiving at least one request to reload the webpage within a threshold period of time, detecting at least one rendering issue associated with the webpage, detecting at least one functionality issue associated with the webpage, detecting at least one attempt by the webpage to access at least one Application Programming Interface (API) function that is adjusted based on the first group of privacy protection measures, detecting at least one attempt by the webpage to interface with at least one remote computing device associated with at least one domain that is blocked based on the first group of privacy protection measures, or detecting at least one attempt by executable code of the webpage to access information included in a uniform resource locator (URL) associated with the webpage.

3. The method of claim 2, wherein the potential impairment comprises at least one of the rendering issue or the functionality issue.

4. The method of claim 1, further comprising, subsequent to reloading the webpage:

determining that enforcing the second group of privacy protection measures has mitigated the potential impairment of the webpage; and registering, within a data store, an entry that associates the second group of privacy protection measures with identifying information of the webpage.

5. The method of claim 4, further comprising:

receiving a request to load the webpage;

determining, based on the entry, that a current group of privacy protection measures enforced at a time the request is received is distinct from the second group of privacy protection measures; and providing at least one supplemental affordance that (i) indicates a second potential impairment of the webpage will occur due to the current group of privacy protection measures, and (ii) enables a second selection of the second group of privacy protection measures to be enforced when loading the webpage.

6. The method of claim 1, further comprising, in conjunction with providing the at least one affordance:

forming the second group of privacy protection measures based on the at least one condition.

7. The method of claim 1, wherein the privacy protection measures comprise at least one of:

at least one Hypertext Transfer Protocol (HTTP) cookie limitation, at least one webpage executable code limitation, at least one web tracker limitation, at least one domain block-list limitation, at least one Internet Protocol (IP) address spoofing limitation, or at least one Application Programming Interface (API) limitation.

8. A non-transitory computer readable storage medium configured to store instructions that, when executed by at least one processor included in a computing device, cause the computing device to carry out steps that include:

enforcing a first group of privacy protection measures while attempting to load a webpage, wherein the webpage includes a first portion and a second portion separate from the first portion, wherein attempting to load the webpage includes loading the first portion of the webpage without loading the second portion of the webpage;

detecting at least one condition indicative of a potential impairment of the webpage due at least in part to enforcing the first group of privacy protection measures, wherein the potential impairment of the webpage includes the second portion of the webpage not being loaded;

providing at least one affordance that (i) acknowledges the potential impairment, and (ii) enables a selection of a second group of privacy protection measures to be enforced when reloading the webpage, wherein the second group of privacy protection measures is distinct from the first group of privacy protection measures; and reloading the webpage in conjunction with receiving the selection to enforce the second group of privacy protection measures.

9. The non-transitory computer readable storage medium of claim 8, wherein detecting the at least one condition comprises at least one of:

receiving at least one request to reload the webpage within a threshold period of time, detecting at least one rendering issue associated with the webpage, detecting at least one functionality issue associated with the webpage, detecting at least one attempt by the webpage to access at least one Application Programming Interface (API) function that is adjusted based on the first group of privacy protection measures, detecting at least one attempt by the webpage to interface with at least one remote computing device associated with at least one domain that is blocked based on the first group of privacy protection measures, or detecting at least one attempt by executable code of the webpage to access information included in a uniform resource locator (URL) associated with the webpage.

10. The non-transitory computer readable storage medium of claim 9, wherein the potential impairment comprises at least one of the rendering issue or the functionality issue.

11. The non-transitory computer readable storage medium of claim 8, wherein the steps further include, subsequent to reloading the webpage:

determining that enforcing the second group of privacy protection measures has mitigated the potential impairment of the webpage; and registering, within a data store, an entry that associates the second group of privacy protection measures with identifying information of the webpage.

12. The non-transitory computer readable storage medium of claim 11, wherein the steps further include:

receiving a request to load the webpage;

determining, based on the entry, that a current group of privacy protection measures enforced at a time the request is received is distinct from the second group of privacy protection measures; and providing at least one supplemental affordance that (i) indicates a second potential impairment of the webpage will occur due to the current group of privacy protection measures, and (ii) enables a second selection of the second group of privacy protection measures to be enforced when loading the webpage.

13. The non-transitory computer readable storage medium of claim 8, wherein the steps further include, in conjunction with providing the at least one affordance:

forming the second group of privacy protection measures based on the at least one condition.

14. The non-transitory computer readable storage medium of claim 8, wherein the privacy protection measures comprise at least one of:

at least one Hypertext Transfer Protocol (HTTP) cookie limitation, at least one webpage executable code limitation, at least one web tracker limitation, at least one domain block-list limitation, at least one Internet Protocol (IP) address spoofing limitation, or at least one Application Programming Interface (API) limitation.

15. A computing device, comprising:

at least one processor; and at least one memory storing instructions that, when executed by the at least one processor, cause the computing device to carry out steps that include:

enforcing a first group of privacy protection measures while attempting to load a webpage, wherein the webpage includes a first portion and a second portion separate from the first portion, wherein attempting to load the webpage includes loading the first portion of the webpage without loading the second portion of the webpage;

detecting at least one condition indicative of a potential impairment of the webpage due at least in part to enforcing the first group of privacy protection measures, wherein the potential impairment of the webpage includes the second portion of the webpage not being loaded;

providing at least one affordance that (i) acknowledges the potential impairment, and (ii) enables a selection of a second group of privacy protection measures to be enforced when reloading the webpage, wherein the second group of privacy protection measures is distinct from the first group of privacy protection measures; and reloading the webpage in conjunction with receiving the selection to enforce the second group of privacy protection measures.

16. The computing device of claim 15, wherein detecting the at least one condition comprises at least one of:

receiving at least one request to reload the webpage within a threshold period of time, detecting at least one rendering issue associated with the webpage, detecting at least one functionality issue associated with the webpage, detecting at least one attempt by the webpage to access at least one Application Programming Interface (API) function that is adjusted based on the first group of privacy protection measures, detecting at least one attempt by the webpage to interface with at least one remote computing device associated with at least one domain that is blocked based on the first group of privacy protection measures, or detecting at least one attempt by executable code of the webpage to access information included in a uniform resource locator (URL) associated with the webpage.

17. The computing device of claim 16, wherein the potential impairment comprises at least one of the rendering issue or the functionality issue.

18. The computing device of claim 15, wherein the steps further include, subsequent to reloading the webpage:

determining that enforcing the second group of privacy protection measures has mitigated the potential impairment of the webpage; and registering, within a data store, an entry that associates the second group of privacy protection measures with identifying information of the webpage.

19. The computing device of claim 18, wherein the steps further include:

receiving a request to load the webpage;

determining, based on the entry, that a current group of privacy protection measures enforced at a time the request is received is distinct from the second group of privacy protection measures; and providing at least one supplemental affordance that (i) indicates a second potential impairment of the webpage will occur due to the current group of privacy protection measures, and (ii) enables a second selection of the second group of privacy protection measures to be enforced when loading the webpage.

20. The computing device of claim 15, wherein the steps further include, in conjunction with providing the at least one affordance:

forming the second group of privacy protection measures based on the at least one condition.

* * * * *